(12) United States Patent
deVries et al.

(10) Patent No.: US 6,275,827 B1
(45) Date of Patent: Aug. 14, 2001

(54) TECHNIQUE FOR PROCESSING DATA

(75) Inventors: Arjen P. deVries, Enschede (NL); Leondias Kontothanassis, Belmont, MA (US); Frederic Dufaux, Chestnut Hill, MA (US); Michael Sokolov, Newton, MA (US); David E. Kovalcin, Jamesburg, NJ (US); Brian Eberman, Newton, MA (US)

(73) Assignee: AltaVista Company, Palo Alto, CA (US)

( * ) Notice: Subject to any disclaimer, the term of this patent is extended or adjusted under 35 U.S.C. 154(b) by 0 days.

(21) Appl. No.: 09/204,287

(22) Filed: Dec. 3, 1998

Related U.S. Application Data

(63) Continuation of application No. 09/037,957, filed on Mar. 11, 1998, now Pat. No. 6,173,287.

(51) Int. Cl.[7] ........................................... G06F 17/00
(52) U.S. Cl. ..................... 707/102; 707/103; 707/512
(58) Field of Search ........................... 707/103, 102, 707/530, 512, 4, 526; 709/205, 217; 364/926, 927; 704/8, 235, 236; 348/12, 13; 345/302, 329, 348, 356

(56) References Cited

U.S. PATENT DOCUMENTS

| | | | |
|---|---|---|---|
| 4,616,336 | * 10/1986 | Robertson et al. | 707/512 |
| 4,864,501 | * 9/1989 | Kucera et al. | 704/8 |
| 5,146,552 | * 9/1992 | Cassorla et al. | 707/512 |
| 5,502,727 | * 3/1996 | Catanzaro et al. | 370/271 |
| 5,581,682 | * 12/1996 | Anderson et al. | 707/530 |
| 5,600,775 | * 2/1997 | King et al. | 707/500 |
| 5,625,833 | * 4/1997 | Levine et al. | 345/507 |
| 5,721,827 | * 2/1998 | Logan et al. | 709/217 |
| 5,822,539 | * 10/1998 | Van Hoff | 709/236 |
| 5,826,025 | * 10/1998 | Gramlich | 709/217 |
| 5,920,694 | * 7/1999 | Carleton et al. | 345/331 |
| 5,938,724 | * 8/1999 | Pommier et al. | 709/205 |

OTHER PUBLICATIONS

Video and Audio: Organization and Retrieval on the WWW http://bspaa.com/vosaic/corp/papers/www5.html.
An Annotation Engine for Supporting Video Database Population http://hulk.bu.edu/pubs/papers/1996/carrer–vane96/TR–08–15–96.html.
Media Stream: An Iconic Visual Language for Video Representation http://web.interval.com/papers/mediastreams/.

* cited by examiner

*Primary Examiner*—Wayne Amsbury
*Assistant Examiner*—Thu-Thao Hawan
(74) *Attorney, Agent, or Firm*—Huton & Williams

(57) ABSTRACT

A technique for processing data is disclosed. In one embodiment, the technique is realized by receiving a first representation of data at a processing device, which then processes the first representation of data so as to generate a second representation of data. The second representation of data includes a plurality of dependent data representations and a plurality of independent data representations. Each of the plurality of dependent data representations is substantially aligned in time with a corresponding one of the plurality of independent data representations.

21 Claims, 13 Drawing Sheets

| OBJECT TABLE | |
|---|---|
| OBJECT ID. | OBJECT TYPE |
| 00000001 | VIDEO |
| 00000002 | AUDIO |
| ⋮ | ⋮ |

FIG. 8

| REPRESENTATION TABLE | | | |
|---|---|---|---|
| REPRESENTATION ID. | OBJECT ID. | REPRESENTATION TYPE | URL |
| 00001000 | 00000001 | VIDEO/MPEG | http://www.digital.com/video.mpg |
| 00001001 | 00000001 | AUDIO/X-REALAUDIO | http://www.digital.com/audio.xra |
| ⋮ | ⋮ | ⋮ | ⋮ |

FIG. 9

| ANNOTATION TABLE 150 | | | | | |
|---|---|---|---|---|---|
| ANNOTATION ID. | OBJECT ID. | ANNOTATION TYPE | ANNOTATION VALUE | ANNOTATION START TIME | ANNOTATION END TIME |
| 01000000 | 00000001 | TRANSCRIPT | "WORD" | 1:00:00.00 | 1:00:05.00 |
| 01000001 | 00000001 | SPEAKER | "SPEAKERNAME" | 2:00:00.00 | 2:00:10.00 |
| 01000002 | 00000001 | KEYFRAME | "URL" | 3:00:00.00 | 3:00:00.20 |
| ⋮ | ⋮ | ⋮ | ⋮ | ⋮ | ⋮ |

TECHNIQUE FOR PROCESSING DATA

This application is a continuation of application Ser. No. 09/037,957, filed on Mar. 11, 1998 now U.S. Pat. No. 6,173,287.

FIELD OF THE INVENTION

The present invention relates generally to the field of multimedia and, more particularly, to a technique for processing data.

BACKGROUND OF THE INVENTION

There are a large number of organizations that presently have substantial amounts of audio, video, and image content in analog form. Many of these organizations are currently moving toward putting such multimedia content into digital form in order to save costs in the areas of data storage and retrieval. That is, similar to other types of data, multimedia content can be easily stored on and retrieved from relatively inexpensive digital storage devices.

The migration of multimedia content from analog form to digital form also provides an organization with the ability to store, search, browse, and retrieve digitized multimedia content from distributed sites. That is, an organization having a number of distributed offices can store, search, browse, and retrieve digitized multimedia content from a centralized storage facility over a proprietary intranet computer network such as, for example, a local area network (LAN), or a public internet computer network such as, for example, the world wide web.

Furthermore, the multimedia content itself may be distributed. That is, an organization that is global in nature may have a number of distributed permanent archival storage locations where digitized multimedia content is permanently stored, or a number of distributed temporary storage locations where digitized multimedia content that is associated with work in progress is temporarily stored. Similar to above, such an organization could also store, search, browse, and retrieve digitized multimedia content from the distributed storage locations over a proprietary intranet computer network or a public internet computer network.

Additionally, an organization may want other entities located outside of the organization to be able to search, browse, and retrieve digitized multimedia content stored and maintained within the organization. For example, an organization may want to sell multimedia content to an outside entity, which may then use the purchased multimedia content for some purpose such as, for example, a news broadcast. Similar to above, the outside entity could search, browse, and retrieve digitized multimedia content from a storage facility within the organization over a proprietary intranet computer network or a public internet computer network.

However, despite the above-described benefits associated with digitized multimedia content, organizations presently have little or no means of searching within multimedia content, organizing information about multimedia content, and delivering multimedia content in a ubiquitous manner. That is, there are presently little or no means for searching inside streams of multimedia content (e.g., audio/video streams), adding meta-information to multimedia content (i.e., annotating multimedia content) for purposes of indexing within multimedia content, and providing universal access to indexed multimedia content over a variety of connection speeds and on a variety of client platforms. Accordingly, it would be desirable to provide a technique for organizing distributed multimedia content and for searching, browsing, and retrieving such organized distributed multimedia content in an efficient and cost-effective manner so as to overcome the above-described shortcomings of the prior art.

OBJECTS OF THE INVENTION

The primary object of the present invention is to provide a technique for processing data.

The above-stated primary object, as well as other objects, features, and advantages, of the present invention will become readily apparent from the following detailed description which is to be read in conjunction with the appended drawings.

SUMMARY OF THE INVENTION

According to the present invention, a technique for processing data is provided. The technique can be realized by receiving a first representation of data at a processing device such as, for example, a data encoder or a data transcoder. The first representation of data can include analog data such as, for example, an analog representation of a video sequence, or digital data such as, for example, a digital representation of a video sequence.

The processing device processes the first representation of data so as to generate a second representation of data. The second representation of data includes a plurality of dependent data representations and a plurality of independent data representations. Preferably, the dependent data representations are arranged in a sequence, and each of the dependent data representations is determined based upon a difference from a previous one of the dependent data representations in the sequence. For example, each of the dependent data representations can represent a respective one of a plurality of difference frames of a video sequence, and each of the difference frames can be determined based upon a difference from a previous one of the difference frames of the video sequence. In contrast, each of the independent data representations is typically determined independently from all other of the independent data representations. For example, each of the independent data representations can represent a respective one of a plurality of complete frames of a video sequence, and each of the complete frames can be determined independently from all other of the complete frames of the video sequence.

Each of the dependent data representations is substantially aligned in time with a corresponding one of the independent data representations. That is, for every one of the dependent data representations there is a corresponding one of the independent data representations, and both are associated with a particular point in time. For example, if the dependent data representations represent difference frames of a video sequence and the independent data representations represent complete frames of the video sequence, then one of the difference frames will correspond in time to one of the complete frames.

Preferably, the first representation of data includes some or all of the dependent data representations included in the second representation of data. The processing device can then process the dependent data representations included in the first representation of data so as to generate the independent data representations included in the second representation of data. The first representation can also include one or more of the independent data representations. However, to avoid redundancy, the first representation of data must not include all of the independent data representations included in the second representation of data.

In one aspect of the present invention, each of the dependent data representations is dependent upon another of the dependent data representations, or upon one of the independent data representations. For example, if the dependent data representations represent difference frames of a video sequence and the independent data representations represent complete frames of the video sequence, then each of the difference frames is dependent upon a previous one of the difference frames of the video sequence or upon a corresponding one of the complete frames of the video sequence.

In another aspect of the present invention, the processing device processes the first representation of data by digitizing the first representation of data, and then encoding the digitized first representation of data so as to generate the plurality of dependent data representations. The processing device can also generate a prediction of the digitized first representation of data, and then encode the prediction of the digitized first representation of data so as to generate the plurality of independent data representations. The processing device can then combine the plurality of dependent data representations and the plurality of independent data representations so as to generate the second representation of data.

In a further aspect of the present invention, the processing device processes the first representation of data by decoding the first representation of data, and then encoding the decoded first representation of data so as to generate the plurality of dependent data representations. The processing device can also generate a prediction of the decoded first representation of data, and then encode the prediction of the decoded first representation of data so as to generate the plurality of independent data representations. The processing device can then combine the plurality of dependent data representations and the plurality of independent data representations so as to generate the second representation of data.

In a still further aspect of the present invention, the processing device processes the first representation of data by digitizing the first representation of data, encoding the digitized first representation of data so as to generate the plurality of dependent data representations, and then encoding the digitized first representation of data so as to generate the plurality of independent data representations. The processing device can then combine the plurality of dependent data representations and the plurality of independent data representations so as to generate the second representation of data.

In a still further aspect of the present invention, the processing device processes the first representation of data by decoding the first representation of data, encoding the decoded first representation of data so as to generate the plurality of dependent data representations, and then encoding the decoded first representation of data so as to generate the plurality of independent data representations. The processing device can then combine the plurality of dependent data representations and the plurality of independent data representations so as to generate the second representation of data.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 8 shows an object table of a meta database in accordance with the present invention.

FIG. 9 shows a representation table of a meta database in accordance with the present invention.

DETAILED DESCRIPTION OF A PREFERRED EMBODIMENT

Figure 1A:
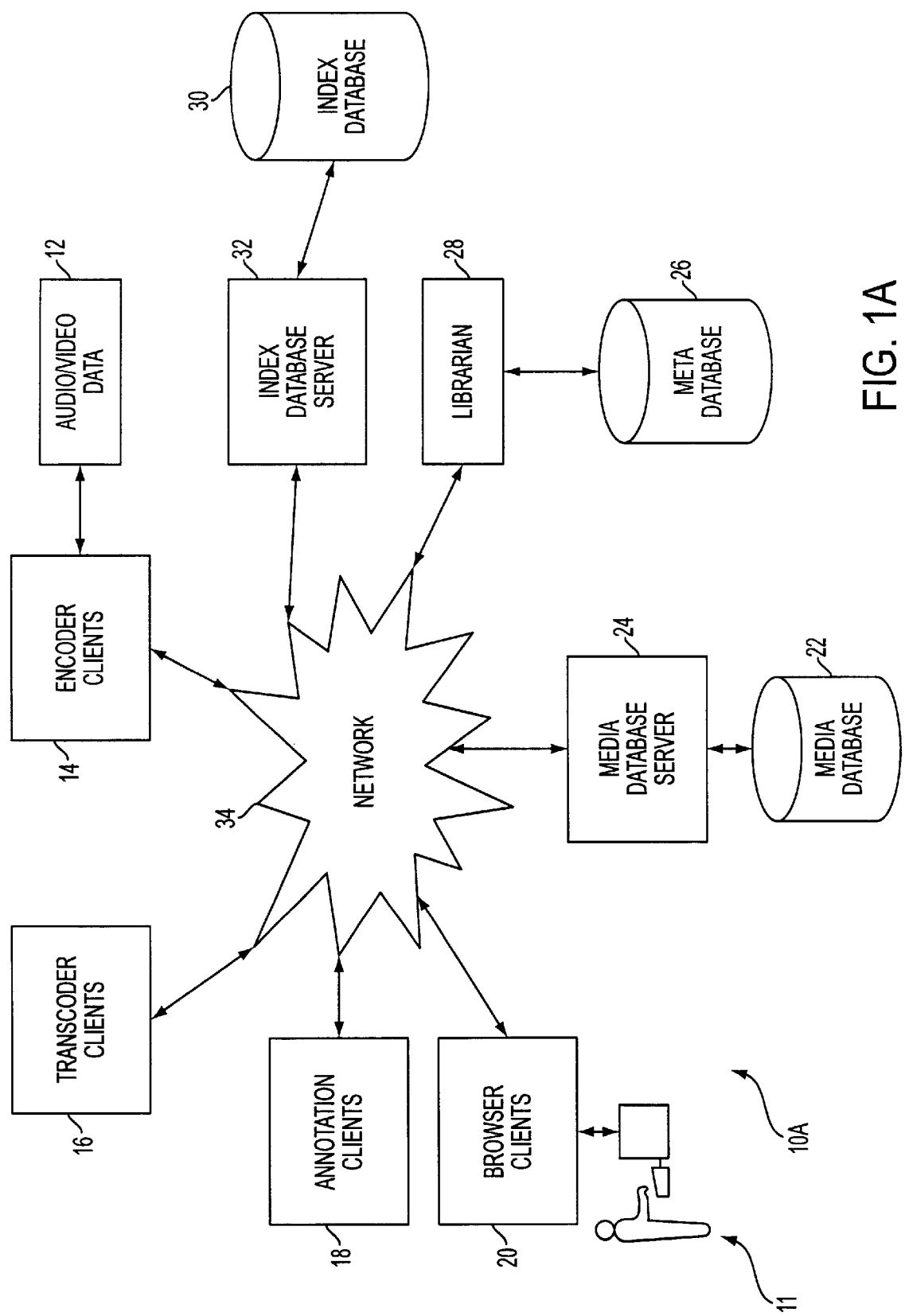
FIG. 1A is a schematic diagram of a first embodiment of a system for organizing distributed multimedia content and for searching, browsing, and retrieving such organized distributed multimedia content in accordance with the present invention.

Referring to FIG. 1A, there is shown a schematic diagram of a first embodiment of a system 10A for organizing distributed multimedia content and for searching, browsing, and retrieving such organized distributed multimedia content in accordance with the present invention. The system 10A comprises a user 11, raw audio/video data 12, at least one encoder client 14, at least one transcoder client 16, at least one annotation client 18, at least one browser client 20, a media database 22, a media database server 24, a meta database 26, a meta database server (librarian) 28, an index database 30, an index database server 32, and a communication network 34 for allowing communication between all of the above-identified components which are connected thereto. The communication network 34 as described herein is an internet protocol (IP) network using hypertext transfer protocol (HTTP) messaging so as to exploit the distributed nature of the world wide web (WWW). However, the system 10A may be implemented using other types of network protocols, and many of the above-identified components may be grouped together in a single processing device so as to altogether eliminate the need for inter- or intra-network communications between these grouped components.

In brief overview, the system 10A operates such that the raw audio/video data 12 is provided to the encoder client 14 for processing by the encoder client 14. Before processing the raw audio/video data 12, the encoder client 14 sends a message over the communication network 34 to the librarian 28 requesting the creation of an object in the meta database 26 corresponding to the raw audio/video data 12. The librarian 28 processes the message from the encoder client 14 by creating an object in the meta database 26 corresponding to the raw audio/video data 12 and assigns the object an object identification number, as described in more detail below. The librarian 28 then sends a message, including the object identification number associated with the raw audio/video data 12, over the communication network 34 to the encoder client 14 notifying the encoder client 14 of the creation of the object in the meta database 26 corresponding to the raw audio/video data 12.

Upon receipt of the notification from the librarian 28, the encoder client 14 digitally encodes the raw audio/video data 12 so as to generate a first digital representation of the raw audio/video data 12, as described in more detail below. The encoder client 14 then sends a message, including the first digital representation of the raw audio/video data 12, over the communication network 34 to the media database server 24 requesting that the media database server 24 store the first digital representation of the raw audio/video data 12 in the media database 22. The media database server 24 processes the message from the encoder client 14 by first checking to see if space is available in the media database 22 to store the first digital representation of the raw audio/video data 12 in the media database 22. If space is not available in the media database 22, the media database server 24 denies the request to store the first digital representation of the raw audio/video data 12 in the media database 22. However, if space is available in the media database 22, the media database server 24 stores the first digital representation of the raw audio/video data 12 at a location in the media database 22 and assigns the location a first universal resource locator (URL). The media database server 24 then sends a message, including the first URL, over the communication network 34 to the encoder client 14 notifying the encoder client 14 of the storage of the first digital representation of the raw audio/video data 12 in the media database 22.

Upon receipt of the notification from the media database server 24, the encoder client 14 sends a message, including the object identification number associated with the raw audio/video data 12 and the first URL, over the communication network 34 to the librarian 28 notifying the librarian 28 of the digital encoding of the raw audio/video data 12 into the first digital representation of the raw audio/video data 12, and the storing of the first digital representation of the raw audio/video data 12 in the media database 22 at the location identified by the first URL. The librarian 28 processes the message from the encoder client 14 by storing the first URL in the meta database 26 along with the object identification number associated with the raw audio/video data 12, as described in more detail below.

The transcoder client 16 periodically sends messages to the librarian 28 requesting work from the librarian 28. The librarian 28 processes such a message from the transcoder client 16 by first checking to see if there are any objects in the meta database 26 that have corresponding digital representations which have not been processed by the transcoder client 16. If there are no objects in the meta database 26 that have corresponding digital representations which have not been processed by the transcoder client 16, then the librarian 28 denies the work request. However, if there are objects in the meta database 26 that have corresponding digital representations which have not been processed by the transcoder client 16, such as, for example, the first digital representation of the raw audio/video data 12, then the librarian 28 sends a message, including the object identification number associated with the raw audio/video data 12 and the first URL, over the communication network 34 to the transcoder client 16, thereby notifying the transcoder client 16 that the first digital representation of the raw audio/video data 12 has not been processed by the transcoder client 16.

Upon receipt of the notification from the librarian 28, the transcoder client 16 sends a message, including the first URL, over the communication network 34 to the media database server 24 requesting that the media database server 24 send a copy of the first digital representation of the raw audio/video data 12 to the transcoder client 16 for processing by the transcoder client 16. The media database server 24 processes the message from the transcoder client 16 by sending a message, including a copy of the first digital representation of the raw audio/video data 12, over the communication network 34 to the transcoder client 16 for processing by the transcoder client 16. The transcoder client 16 processes the copy of the first digital representation of the raw audio/video data 12 such that a second digital representation of the raw audio/video data 12 is generated, as described in more detail below.

After the transcoder client 16 has processed the copy of the first digital representation of the raw audio/video data 12, and generated the second digital representation of the raw audio/video data 12, the transcoder client 16 sends a message, including the second digital representation of the raw audio/video data 12, over the communication network 34 to the media database server 24 requesting that the media database server 24 store the second digital representation of the raw audio/video data 12 in the media database 22. The media database server 24 processes the message from the transcoder client 16 by first checking to see if space is available in the media database 22 to store the second digital representation of the raw audio/video data 12 in the media database 22. If space is not available in the media database 22, the media database server 24 denies the request to store the second digital representation of the raw audio/video data 12 in the media database 22. However, if space is available in the media database 22, the media database server 24 stores the second digital representation of the raw audio/video data 12 at a location in the media database 22 and assigns the location a second URL. The media database server 24 then sends a message, including the second URL, over the communication network 34 to the transcoder client 16 notifying the transcoder client 16 of the storing of the second digital representation of the raw audio/video data 12 in the media database 22 at the location identified by the second URL.

Upon receipt of the notification from the media database server 24, the transcoder client 16 sends a message, including the object identification number associated with the raw audio/video data 12 and the second URL, over the communication network 34 to the librarian 28 notifying the librarian 28 of the transcoding of the first digital representation of the raw audio/video data 12 into the second digital representation of the raw audio/video data 12, and the storing of the second digital representation of the raw audio/video data 12 in the media database 22 at the location identified by the second URL. The librarian 28 processes the message from the transcoder client 16 by storing the second URL in the meta database 26 along with the object identification number associated with the raw audio/video data 12, as described in more detail below.

The annotation client 18 periodically sends messages to the librarian 28 requesting work from the librarian 28. The librarian 28 processes such a message from the annotation client 18 by first checking to see if there are any objects in the meta database 26 that have corresponding digital representations which have not been processed by the annotation client 18. If there are no objects in the meta database 26 that have corresponding digital representations which have not been processed by the annotation client 18, then the librarian 28 denies the work request. However, if there are objects in the meta database 26 that have corresponding digital representations which have not been processed by the annotation client 18, such as, for example, the first digital representation of the raw audio/video data 12, then the librarian 28 sends a message, including the object identification number associated with the raw audio/video data 12 and the first URL, over the communication network 34 to the annotation client 18, thereby notifying the annotation client 18 that the first digital representation of the raw audio/video data 12 has not been processed by the annotation client 18.

Upon receipt of the notification from the librarian 28, the annotation client 18 sends a message, including the first URL, over the communication network 34 to the media database server 24 requesting that the media database server 24 send a copy of the first digital representation of the raw audio/video data 12 to the annotation client 18 for processing by the annotation client 18. The media database server 24 processes the message from the annotation client 18 by sending a message, including a copy of the first digital representation of the raw audio/video data 12, over the communication network 34 to the annotation client 18 for processing by the annotation client 18. The annotation client 18 processes the copy of the first digital representation of the raw audio/video data 12 so as to generate annotations for the object in the meta database 26 corresponding to the raw audio/video data 12, as described in more detail below.

After the annotation client 18 has processed the copy of the first digital representation of the raw audio/video data 12, and generated the annotations for the object in the meta database corresponding to the raw audio/video data 12, the annotation client 18 sends a message, including the object identification number associated with the raw audio/video data 12 and the annotations that were generated for the object in the meta database corresponding to the raw audio/video data 12, over the communication network 34 to the librarian 28 notifying the librarian 28 of the generating of the annotations for the object in the meta database corresponding to the raw audio/video data 12. The librarian 28 processes the message from the annotation client 18 by storing the annotations that were generated for the object in the meta database corresponding to the raw audio/video data 12 in the meta database 26 along with the object identification number associated with the raw audio/video data 12, as described in more detail below.

The index database server 32 periodically sends messages to the librarian 28 requesting a list of object identification numbers from the librarian 28 which correspond to objects that have been created in the meta database 26. The librarian 28 processes such a message from the index database server 32 by sending a message, including a list of object identification numbers corresponding to objects that have been created in the meta database 26, over the communication network 34 to the index database server 32 for processing by the index database server 32. The index database server 32 processes the message from the librarian 28 by sending a message, including, for example, the object identification number associated with the raw audio/video data 12, over the communication network 34 to the librarian 28 requesting that the librarian 28 send a copy of the annotations that were generated for the object in the meta database corresponding to the raw audio/video data 12, such as, for example, the annotations that were generated for the object in the meta database corresponding to the raw audio/video data 12. The librarian 28 processes the message from the index database server 32 by sending a message, including the annotations that were generated for the object in the meta database corresponding to the raw audio/video data 12, over the communication network 34 to the index database server 32 for processing by the index database server 32. The index database server 32 processes the message from the librarian 28 by storing the annotations that were generated for the object in the meta database corresponding to the raw audio/video data 12 in the index database 30 along with, or with reference to, the object identification number associated with the raw audio/video data 12, as described in more detail below.

The browser client 20 allows the user 11 to interface with the index database server 32 such that the user 11 is allowed to search, browse, and retrieve all or a portion of a digital representation such as, for example, the first digital representation of the raw audio/video data 12. The browser client 20 sends a message, initiated by the user 11, over the communication network 34 to the index database server 32 requesting a search of the index database 30. The index database server 32 processes the message from the browser client 20 by sending a message, including a hypertext markup language (HTML) query page, to the browser client 20 for presentation to the user 11. The browser client 20 then presents the HTML query page to the user 11. The HTML query page is such that it allows the user 11 to enter textual and boolean queries.

The user 11 enters a query through the HTML query page and the browser client 20 sends a message, including the query, over the communication network 34 to the index database server 32 for processing by the index database server 32. The index database server 32 processes the message from the browser client 20 by searching the index database 30 for annotations which match the query, and obtaining the object identification number associated with each matching annotation, as described in more detail below. The index database server 32 then sends a message, including each matching annotation and the object identification number associated with each matching annotation, over the communication network 34 to the librarian 28 requesting that the librarian 28 provide the URL of the digital representation from which each matching annotation was generated such as, for example, the first URL. The librarian 28 processes the message from the index database server 32 by searching the meta database 26 for the URL of the digital representation from which each matching annotation was generated, as described in more detail below. The librarian 28 then sends a message, including each matching annotation, the URL of the digital representation from which each matching annotation was generated, and the object identification number associated with each matching annotation, over the communication network 34 to the index database server 32 for processing by the index database server 32.

The index database server 32 processes the message from the librarian 28 by building an HTML results page for presentation to the user 11. The index database server 32 builds the HTML results page by creating an image or an icon corresponding to the URL of the digital representation from which each matching annotation was generated. That is, each image or icon is hyperlinked to a function or script which allows the user 11 to browse and/or retrieve all or a portion of a corresponding digital representation such as, for example, the first digital representation of the raw audio/ video data 12. Once the HTML results page has been built, the index database server 32 sends a message, including the HTML results page, to the browser client 20 for presentation to the user 11. The browser client 20 then presents the HTML results page to the user 11 so that the user 11 can select one of the images or icons so as to browse and/or retrieve all or a portion of a corresponding digital representation such as, for example, the first digital representation of the raw audio/video data 12.

In order to browse and/or retrieve all or a portion of a digital representation such as, for example, the first digital representation of the raw audio/video data 12, a method for efficiently delivering slices of media from large media streams is required. For real-time media streams such as video or audio tracks, URLs must be extended to specify not only a desired file but also the starting and ending time that is to be returned to a requesting entity. This can be done by attaching one or more server extensions to a standard HTTP server such that an URL of the form:
http://www.digital.com/movie.mpg?st=1:00:00.00?et=1:00:05.00
will cause a server extension attached to the standard HTTP server, in this case named "www.digital.com", to fetch and stream the moving pictures expert group (MPEG) stream for "movie" starting at time code "1:00:00.00" and ending at time code "1:00:05.00". In the system 10A shown in FIG. 1A, the media database server 24 has a server extension for performing these fetch and stream operations.

The generalization of the above-described technique is to provide a well known method for selecting a portion of a digital representation using specified file parameters. The URL can be of the form:
http://server/file_name?file_parameter
Such a generalization allows the file_parameter field to specify a format in which a digital representation will be supplied. Thus, the transcoding of a digital representation into another format can be requested of the media database server 24 by so indicating in the file_parameter field. For example, to extract MPEG audio from an MPEG system stream, the media database server 24 will receive an URL in the above-described form from a requesting entity. The media database server 24 determines the appropriate server extension based upon what is indicated in the file_parameter field. The media database server 24 then passes the file_name and the file_parameter to the appropriate server extension. The server extension then generates a multipurpose internet mail extension (MIME) header which is sent to the requesting entity through the media database server 24. The server extension then opens the file indicated in the file_name field and strips-off any header information that may be contained at the beginning of the file. The file_parameter identifies the portion of the file that was requested by the requesting entity, and optionally drives transcoding or sub-stream extraction. The server extension then generates a new header and provides the requested file portion to the media database server 24, which then sends the requested file portion to the requesting entity.

Although this generalized technique is feasible, the efficiency of the approach depends upon the implementation of the server extension for each type of representation. For video sequence representation types such as MPEG and/or H.263, the present invention allows for the storing of extra information alongside a primary video stream. This makes it possible to return a portion of the primary video stream to a requesting entity from almost any location within the primary video stream without increasing the network bit rate requirements, as described below.

Efficient image sequence encoding for video sequences exploits the redundancy that occurs in a sequence of frames. In a video sequence for a single scene, only a few objects will move from one frame to the next. This means that by applying motion compensation it is possible to predict a current image in the video sequence from a previous image. Furthermore, this implies that the current image can be reconstructed from a previously transmitted image if all that is sent to a requesting entity are motion vectors and a difference between a predicted image and an actual image. This technique is well known and is termed predictive encoding.

The predictive encoding technique can be extended to make predictions about a current image based upon any prior image and any future image. However, the details of such an extension are not necessary to understanding the methodology of the present invention. What is necessary to understanding the methodology of the present invention, is that an image frame which has been encoded independently of any other frame is defined as an intra or I-frame, and an image frame which has been encoded based upon a previous frame is defined as a predicted or P-frame.

An important extension of the above discussion, is that frames are generally encoded by breaking them into fix sized blocks. Each block can then be separately encoded by producing an I-block, or each block can be encoded using previous blocks by producing a P-block. Transmitted frames can then consist of a mixture of I-blocks and P-blocks. Additional encoding efficiency is generally gained through this technique.

For network transmissions, the critical thing is to minimize bandwidth while maintaining accuracy in a reconstructed image. These two issues are balanced by sending as many P-frames or P-blocks as possible, and sending only an occasional I-frame or I-block when it is necessary to correct errors. This is because I-frames and I-blocks are substantially larger than P-frames and P-blocks. Therefore, a typical encoder will generate an encoded file that consists mostly of P-frames and P-blocks with the occasional I-frame and I-block. Maximum efficiency is gained by only ever providing one I-frame at the head of a file, and then only providing a mixture of I-blocks and P-blocks to rest of the file.

However, it should be apparent from this discussion that the above-described approach is incompatible with being able to transmit a valid image sequence file from any location within a primary video stream. This is because an image sequence decoder can only start decoding from a complete I-frame. If there is only one I-frame in a file, and it is located at the head of the file, then that is the only place in the file from which the image sequence decoder can start decoding the file. The file must therefore be transmitted from its beginning, which typically results in decreased transmission efficiency.

The simplest way to correct this problem is to force the encoder to place I-frames at periodic locations within a primary video sequence. The primary video sequence can then be decoded from any location where an I-frame has been placed. However, this decreases the encoding efficiency.

The present invention solves this problem by maintaining a secondary bit stream of I-frames which can be used to jump into the primary bit stream from any location where an I-frame has been stored. This secondary bit stream of I-frames can be generated by a secondary encoder, which can be included in both the encoder client 14 and the transcoder client 16. This secondary bit stream is combined with the primary bit stream to produce the first digital representation of the raw audio/video data 12 and the second digital representation of the raw audio/video data 12, as described above.

Figure 2:
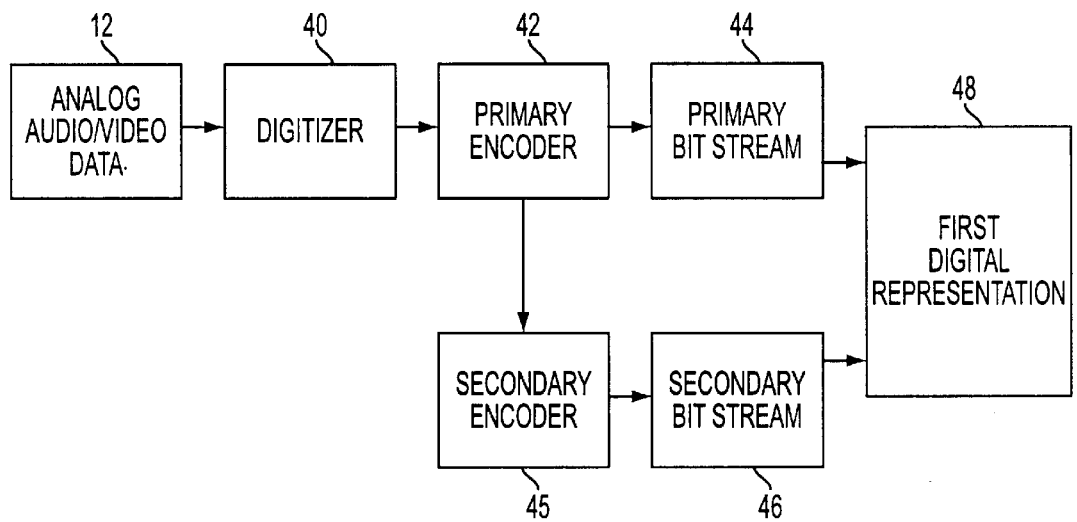
FIG. 2 is a flowchart diagram detailing the processing steps of an encoder client in accordance with the present invention.

Referring to FIG. 2, there is shown a flowchart diagram detailing the processing steps of the encoder client 14. The encoder client 14 processes the raw audio/video data 12, which is typically in analog form, by digitizing the raw audio/video data 12 with a digitizer 40. The digitized audio/video data is then encoded by a primary encoder 42, which generates a primary bit stream 44 for the first digital representation of the raw audio/video data 12 and a prediction of the primary bit stream for the first digital representation of the raw audio/video data 12. The prediction of the primary bit stream for the first digital representation of the raw audio/video data 12 is separately encoded by a secondary encoder 45 to generate a secondary bit stream 46 for the first digital representation of the raw audio/video data 12. The primary bit stream 44 for the first digital representation of the raw audio/video data 12 and the secondary bit stream 46 for the first digital representation of the raw audio/video data 12 are then combined to form the first digital representation 48 of the raw audio/video data 12, which is stored in the media database 22 at the location identified by the first URL, as described above. The primary bit stream 44 for the first digital representation of the raw audio/video data 12 is typically in a form of an I-frame and a plurality of P-frames, whereas the secondary bit stream 46 for the first digital representation of the raw audio/video data 12 is in the form of all I-frames. The first digital representation 48 of the raw audio/video data 12 is typically stored in a file in the media database 22. The file typically has a header which has pointers to the beginnings of the primary bit stream 44 and the secondary bit stream 46 within the file. It should be noted that the primary bit stream 44 for the first digital representation of the raw audio/video data 12 and the secondary bit stream 46 for the first digital representation of the raw audio/video data 12 must be in the same format such as, for example, JPEG, MPEG or H.263.

Figure 3:
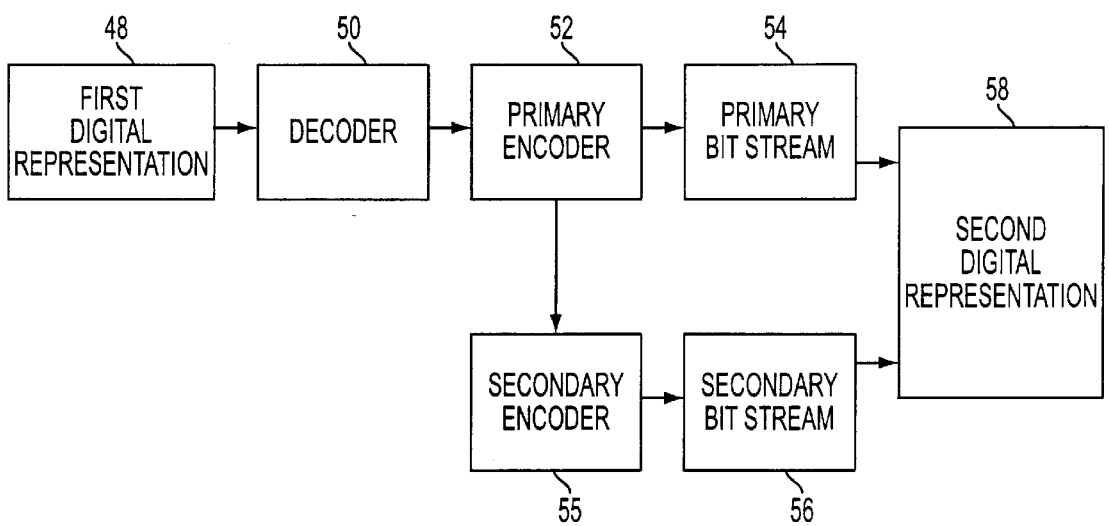
FIG. 3 is a flowchart diagram detailing the processing steps of a transcoder client in accordance with the present invention.

Referring to FIG. 3, there is shown a flowchart diagram detailing the processing steps of the transcoder client 16. The transcoder client 16 processes the first digital representation 48 of the raw audio/video data 12 by decoding the first digital representation 48 of the raw audio/video data 12 with a decoder 50. The decoded audio/video data is then encoded by a primary encoder 52, which generates a primary bit stream 54 for the second digital representation of the raw audio/video data 12 and a prediction of the primary bit stream for the second digital representation of the raw audio/video data 12. The prediction of the primary bit stream for the second digital representation of the raw audio/video data 12 is separately encoded by a secondary encoder 55 to generate a secondary bit stream 56 for the second digital representation of the raw audio/video data 12. The primary bit stream 54 for the second digital representation of the raw audio/video data 12 and the secondary bit stream 56 for the second digital representation of the raw audio/video data 12 are then combined to form the second digital representation 58 of the raw audio/video data 12, which is stored in the media database 22 at the location identified by the second URL, as described above. The primary bit stream 54 for the second digital representation of the raw audio/video data 12 is typically in a form of an I-frame and a plurality of P-frames, whereas the secondary bit stream 56 for the second digital representation of the raw audio/video data 12 is in the form of all I-frames. The second digital representation 58 of the raw audio/video data 12 is typically stored in a file in the media database 22. The file typically has a header which has pointers to the beginnings of the primary bit stream 54 and the secondary bit stream 56 within the file. It should be noted that the primary bit stream 54 for the second digital representation of the raw audio/video data 12 and the secondary bit stream 56 for the second digital representation of the raw audio/video data 12 must be in the same format such as, for example, JPEG, MPEG or H.263.

Figure 4:
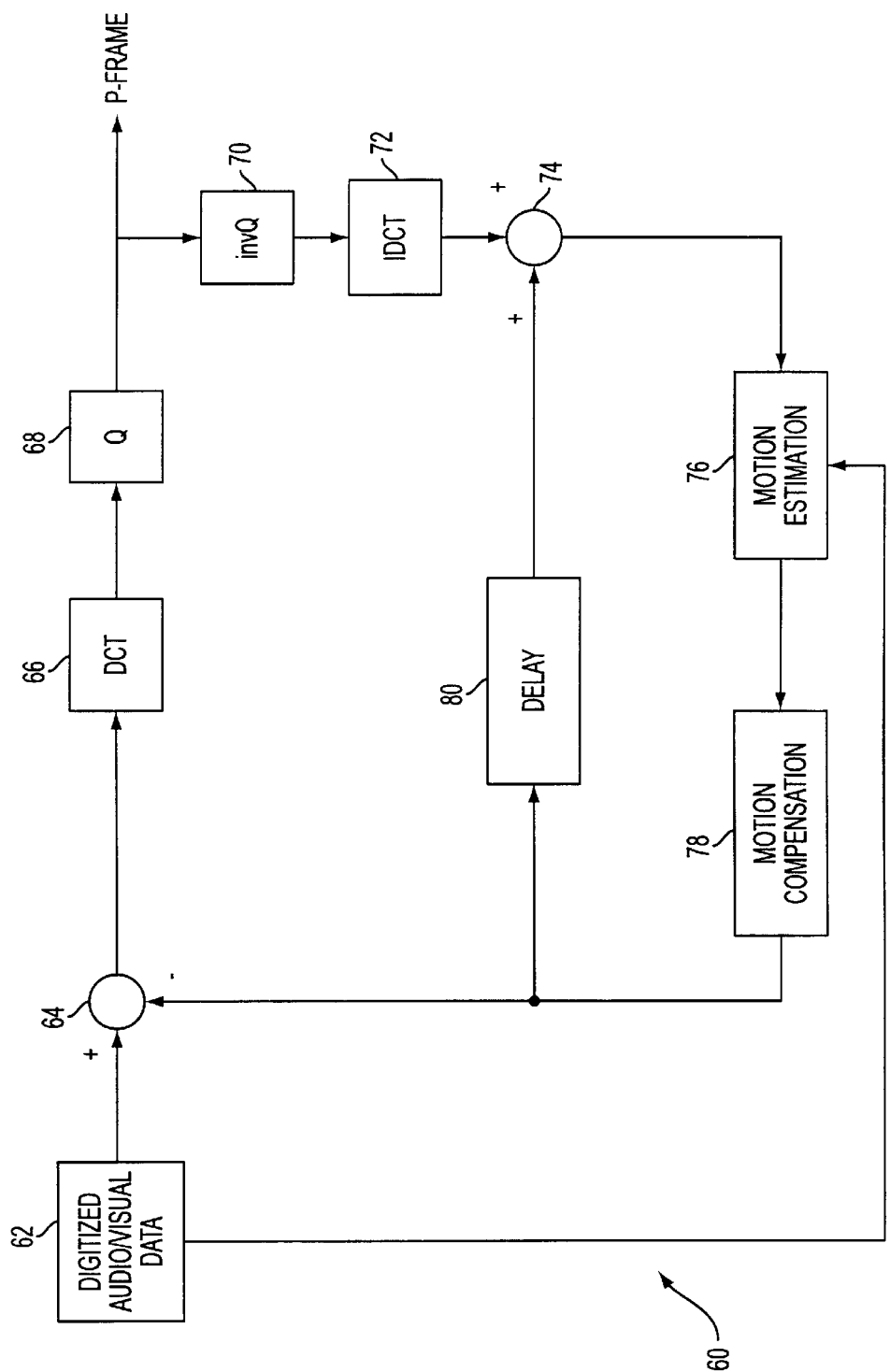
FIG. 4 is a flowchart diagram of an encoding process for use in an encoder and transcoder in accordance with the present invention.

The primary encoder 42 in the encoder client 14 and the primary encoder 52 in the transcoder client 16 can both operate according to an encoding process 60 such as shown in FIG. 4. This encoding process 60 comprises digitized audio/visual data 62, a differencing function 64, a discrete cosine transform (DCT) function 66, a quantization (Q) function 68, an inverse quantization (invQ) function 70, an inverse discrete cosine transform function (IDCT) 72, an adding function 74, a motion estimation function 76, a motion compensation function 78, and a delay function 80. A current frame of the digitized audio/visual data 62 is processed according to the encoding process 60 by differencing the current frame of the digitized audio/visual data 62 with a prediction of the current frame at the differencing function 64. The difference between the current frame of the digitized audio/visual data 62 and the prediction of the current frame is encoded by the discrete cosine transform (DCT) function 66 and the quantization (Q) function 68 to produce an encoded P-frame for a digital representation of the digitized audio/visual data 62. This encoded P-frame is decoded by the inverse quantization (invQ) function 70 and the inverse discrete cosine transform function (IDCT) 72, and then added to a delayed prediction of the current frame by the adding function 74. The prediction of the current frame is determined by subjecting the output of the adding function 74 to the motion estimation function 76 and the motion compensation function 78. It is this prediction of the current frame that is encoded by the secondary encoder 45 in the encoder client 14 and the secondary encoder 55 in the transcoder client 16, as described above.

At this point it should be noted that similar results can be obtained by encoding each frame of the digitized audio/visual data 62 so as to produce the secondary bit stream 46 for the first digital representation of the raw audio/video data 12 and the secondary bit stream 56 for the second digital representation of the raw audio/video data 12, as described above.

Figure 1B:
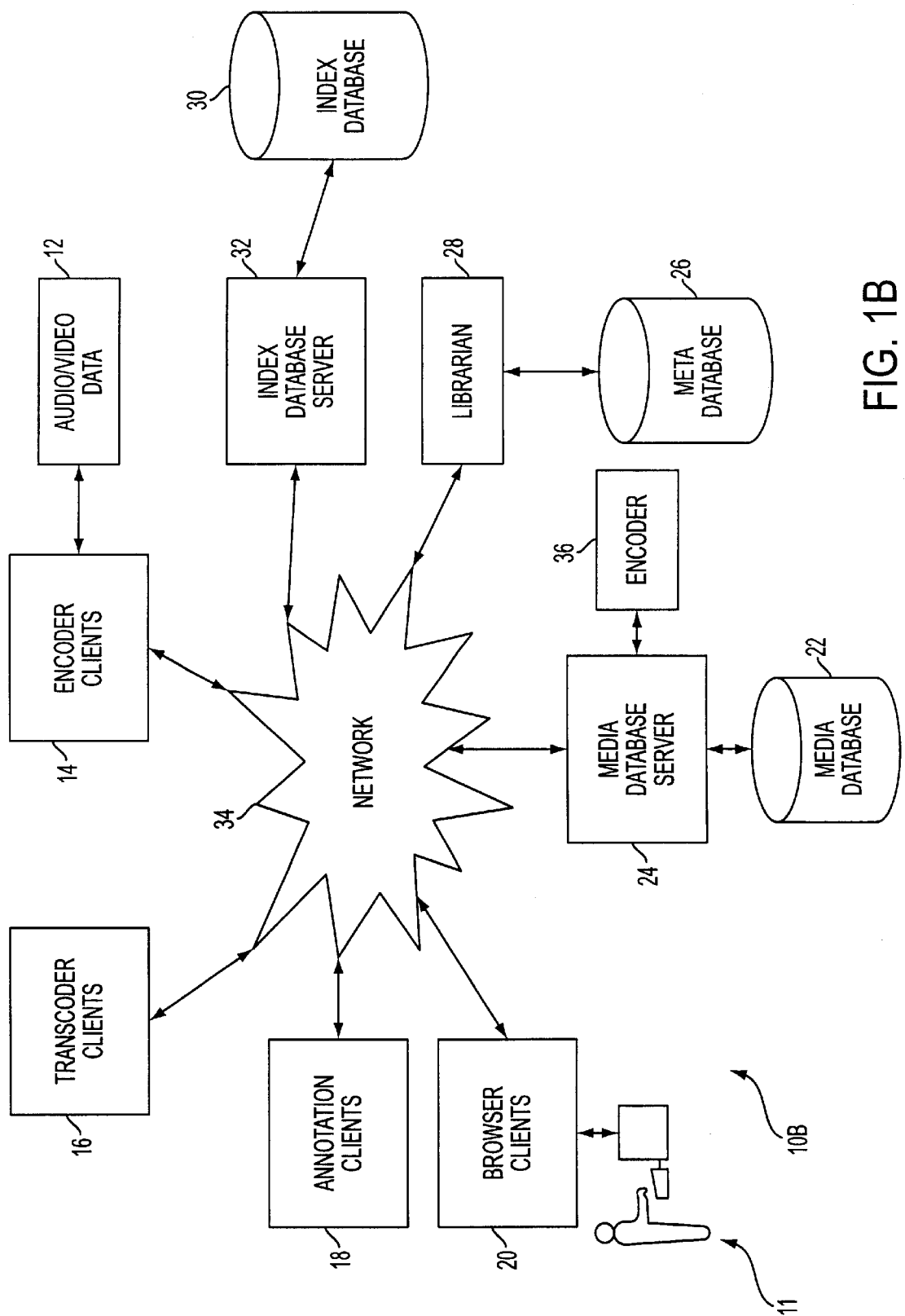
FIG. 1B is a schematic diagram of a second embodiment of a system for organizing distributed multimedia content and for searching, browsing, and retrieving such organized distributed multimedia content in accordance with the present invention.

It should also be noted that both the secondary bit stream 46 for the first digital representation of the raw audio/video data 12 and the secondary bit stream 56 for the second digital representation of the raw audio/video data 12 could alternatively be generated at an encoder associated with the media database server 24. For example, referring to FIG. 1B, there is shown a schematic diagram of a second embodiment of a system 10B for organizing distributed multimedia content and for searching, browsing, and retrieving such organized distributed multimedia content in accordance with the present invention. The system 10B is identical to the system 10A except for the addition of an encoder 36, and that the encoder client 14 and the transcoder client 16 would no longer require the secondary encoder 46 and the secondary encoder 56, respectively, as described above. The encoder 36 would generate both the secondary bit stream 46 for the first digital representation of the raw audio/video data 12 and the secondary bit stream 56 for the second digital representation of the raw audio/video data 12. That is, the encoder client 14 would generate the primary bit stream 44 as described above, and then transmit the primary bit stream 44 to the media database server 24. The media database server 24 would then provide the primary bit stream 44 to the encoder 36, which would then generate the secondary bit stream 46. The encoder 36 would then provide the secondary bit stream 46 to the media database server 24. The media database server 24 would then combine the primary bit stream 44 for the first digital representation of the raw audio/video data 12 and the secondary bit stream 46 for the first digital representation of the raw audio/video data 12 to form the first digital representation 48 of the raw audio/video data 12, which is then stored in the media database 22 at the location identified by the first URL, as described above. Similarly, the transcoder client 16 would generate the primary bit stream 54 as described above, and then transmit the primary bit stream 54 to the media database server 24. The media database server 24 would then provide the primary bit stream 54 to the encoder 36, which would then generate the secondary bit stream 56. The encoder 36 would then provide the secondary bit stream 56 to the media database server 24. The media database server 24 would then combine the primary bit stream 54 for the second digital representation of the raw audio/video data 12 and the secondary bit stream 56 for the second digital representation of the raw audio/video data 12 to form the second digital representation 58 of the raw audio/video data 12, which is then stored in the media database 22 at the location identified by the second URL, as described above. The foregoing is beneficial in that only the primary bit stream 44 and the primary bit stream 54 are transmitted from the encoder client 14 and the transcoder client 16, respectively, to the media database server 22, which increases transmission efficiency.

It should further be noted that the primary bit streams 44 and 54 and the secondary bit streams 46 and 56 as described above only represent the video portion of the first digital representation 48 of the raw audio/video data 12 and the second digital representation 58 of the raw audio/video data 12, respectively. That is, a digital representation of an audio/video bit stream consists of three components: an audio layer, a video layer, and a system layer. The system layer tells a decoder how audio and video are interleaved in the audio/video bit stream. The decoder uses this information to split the audio/video bit stream into components and send each component to its appropriate decoder. On the other end, a video encoder takes a non-encoded video stream and provides an encoded video stream which is then combined with an encoded audio stream to create the three component audio/video stream. Thus, the primary bit streams 44 and 54 and the secondary bit streams 46 and 56 as described above represent video streams which will be combined with audio streams to create three component audio/video streams.

In view of the above, it is now appropriate to indicate that the media database server 24 stores the first digital representation 48 of the raw audio/video data 12 in the media database 22 such that each P-frame in the primary bit stream 44 for the first digital representation of the raw audio/video data 12 references a corresponding I-frame in the secondary bit stream 46 for the first digital representation of the raw audio/video data 12, and vice versa. Thus, the user 11 can browse and/or retrieve a desired portion of the first digital representation 48 starting at any arbitrary location within the first digital representation 48 by first obtaining an I-frame from the secondary bit stream 46 for the first digital representation of the raw audio/video data 12 which corresponds to the arbitrary starting location of the desired portion, and then obtaining P-frames from the primary bit stream 44 for the first digital representation of the raw audio/video data 12 for all subsequent locations of the desired portion. This is beneficial in that the media database server 24 will only have to send a message containing a single I-frame in order for the user 11 to browse and/or retrieve a desired portion of the first digital representation 48, thereby obtaining maximum network transmission efficiency while maintaining the encoding advantages of only a single I-frame in the primary bit stream 44 for the first digital representation of the raw audio/video data 12.

Similarly, the media database server 24 stores the second digital representation 58 of the raw audio/video data 12 in the media database 22 such that each P-frame in the primary bit stream 54 for the second digital representation of the raw audio/video data 12 references a corresponding I-frame in the secondary bit stream 56 for the second digital representation of the raw audio/video data 12, and vice versa. Thus, the user 11 can browse and/or retrieve a desired portion of the second digital representation 58 starting at any arbitrary location within the second digital representation 58 by first obtaining an I-frame from the secondary bit stream 56 for the second digital representation of the raw audio/video data 12 which corresponds to the arbitrary starting location of the desired portion, and then obtaining P-frames from the primary bit stream 54 for the second digital representation of the raw audio/video data 12 for all subsequent locations of the desired portion. This is beneficial in that the media database server 24 will only have to send a message containing a single I-frame in order for the user 11 to browse and/or retrieve a desired portion of the second digital representation 58, thereby obtaining maximum network transmission efficiency while maintaining the encoding advantages of only a single I-frame in the primary bit stream 54 for the second digital representation of the raw audio/video data 12.

Figure 5:
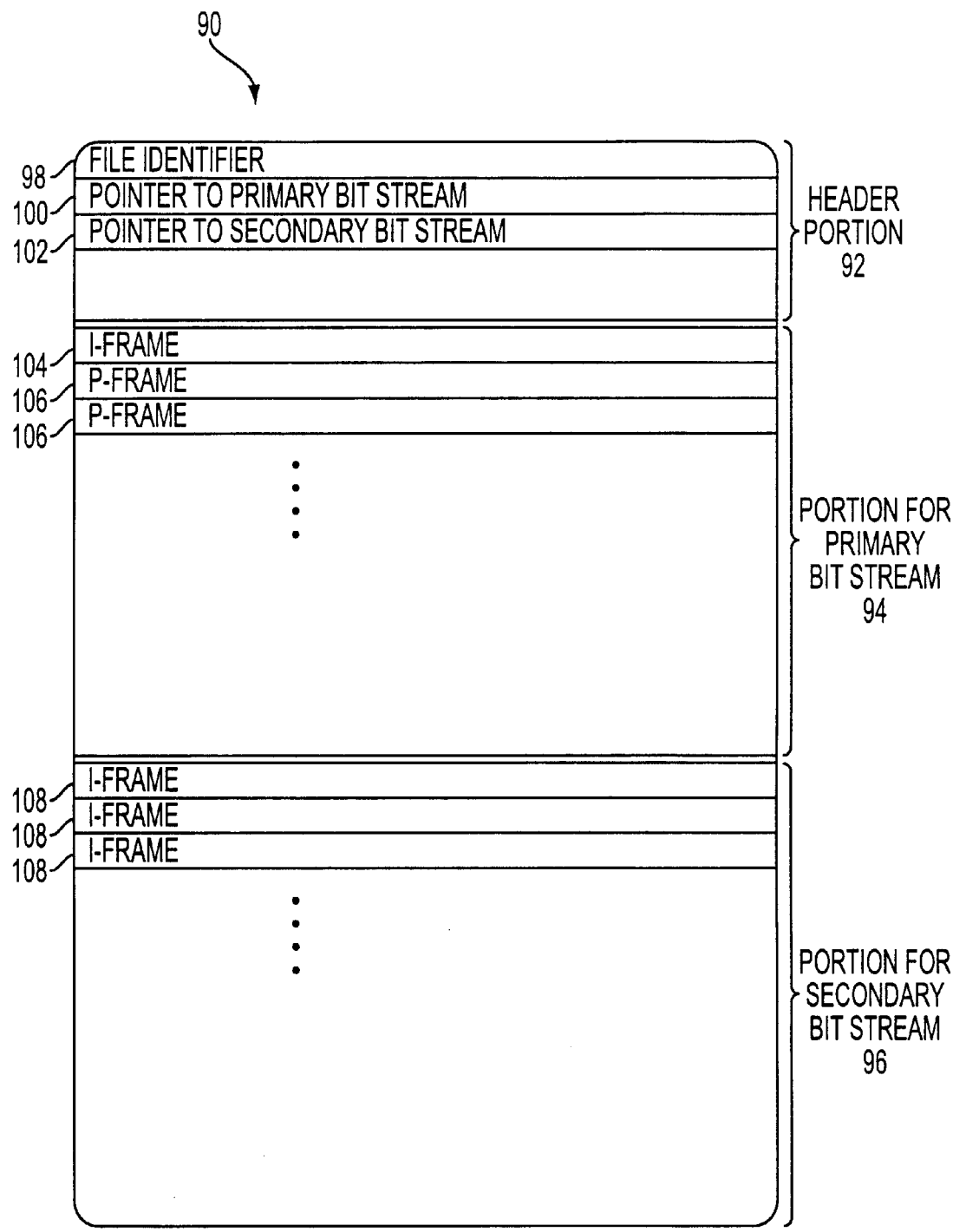
FIG. 5 shows the file structure for a file that is stored in a media database containing a digital representation of audio/video data in accordance with the present invention.

Referring to FIG. 5, there is shown a file structure for a file 90 that is stored in the media database 22 containing either the first digital representation 48 of the raw audio/video data 12 or the second digital representation 58 of the raw audio/video data 12. The file 90 comprises a header portion 92, a primary bit stream portion 94, and a secondary bit stream portion 96. The header portion 92 comprises a file identifier 98 for either the first digital representation 48 of the raw audio/video data 12 or the second digital representation 58 of the raw audio/video data 12, a pointer 100 to the beginning of the primary bit stream portion 94, and a pointer 102 to the beginning of the secondary bit stream portion 96. The primary bit stream portion 94 comprises an I-frame 104 and a plurality of P-frames 106. The secondary bit stream portion 96 comprises a plurality of I-frames 108. The references between the P-frames 106 in the primary bit stream portion 94 and the I-frames 108 in the secondary bit stream portion 96, and vice versa, can be included in the P-frames 106 in the primary bit stream portion 94 and the I-frames 108 in the secondary bit stream portion 96. Alternatively, the header portion 92 can include additional pointers to corresponding P-frames 106 in the primary bit stream portion 94 and I-frames 108 in the secondary bit stream portion 96.

As previously described, the annotation client 18 processes the copy of the first digital representation of the raw audio/video data 12 such that annotations are generated for the object in the meta database 26 corresponding to the raw audio/video data 12. The librarian 28 then stores these annotations in the meta database 26 along with the object identification number associated with the raw audio/video data 12. The implementation of these steps in accordance with the present invention is directly related to annotation processes and the structure of the meta database 26.

Annotations are generated for an object so as to provide information about the whole object or a part of the object. Annotations may be generated for an object by trusted automatic processes called annotation daemons, such as the annotation client 18, or by trusted human annotators. Annotations which have previously been generated for an object, including both annotations produced by annotation daemons or by human annotators, may be reviewed and updated.

Figure 6:
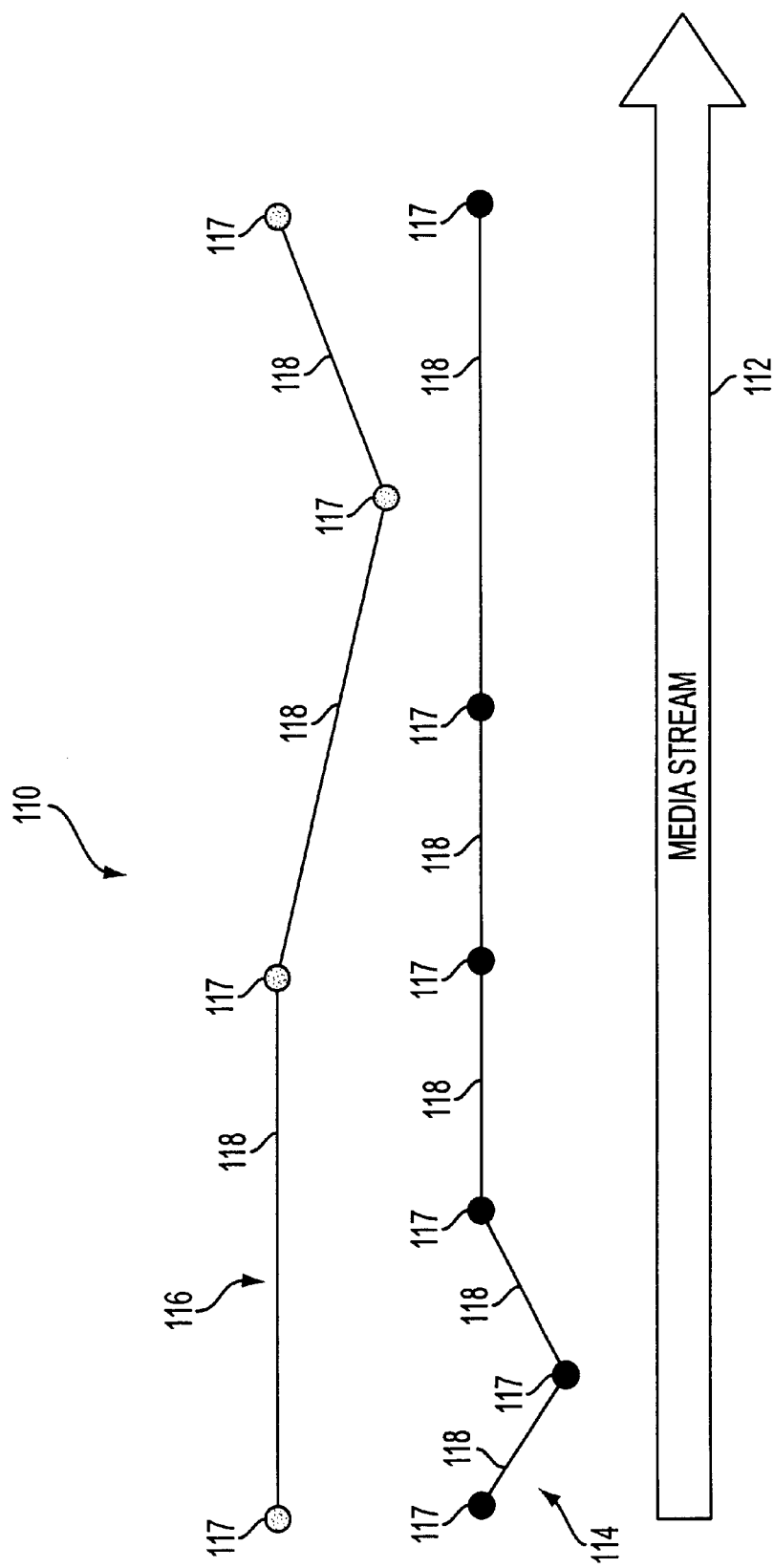
FIG. 6 shows an annotation structure for an object in accordance with the present invention.

Annotations in accordance with the present invention are a typed, probabilistic, stratified collection of values. Referring to FIG. 6, there is shown an annotation structure 110 for an object in accordance with the present invention. The annotation structure 110 comprises a first annotation sequence 114 and a second annotation sequence 116. The first annotation sequence 114 and the second annotation sequence 116 relate to a media stream 112, which can be either an audio or a video stream. Each annotation sequence represents a different type of annotation such as, for example, words that occur in the media stream 112 or speakers that are recognized in the media stream 112.

Each annotation sequence contains a plurality of time marks 117 and a plurality of arcs 118. Each time mark 117 represents an instant in time. Each arc 118 represents an interval of time. Each arc 118 also has an associated value and probability. The probability is a measure of confidence in the accuracy of the annotation. The use of a probability allows probabilistic-based retrieval to be supported. The use of a probability also allows the quality (e.g., higher or lower quality) of a replacement annotation to be determined. Each annotation sequence can be applied to the entire media stream 112 or to a part thereof.

The annotation structure 110 as described above differs from many video annotation systems that work on shot lists. In this prior art approach, a video is first broken down into thematic chunks called shots that are then grouped into scenes. Each shot is then taken as a basic atomic unit for annotation. That is, each shot is annotated, and searching will only retrieve particular shots. The difficulty of this prior approach is that performing the above processing automatically can be very difficult. The present invention avoids this difficulty by allowing the presence of people and things to be marked within a scene.

The structure of the meta database 26 is such that it is an object database built on top of standard relational databases. Each object in the object database of the meta database 26 represents some form of audio/video data such as, for example, the raw audio/video data 12, as described above. For every object in the object database of the meta database 26 there can be one or more representations and/or annotations. A representation of an object in the object database of the meta database 26 can be a representation of the audio/video data that is represented by the object in the object database of the meta database 26 such as, for example, the first digital representation of the raw audio/video data 12, as described above. An annotation of an object in the object database of the meta database 26 can be an annotation that is generated by processing one or more representations of the audio/video data that is represented by the object in the object database of the meta database 26 such as, for example, an annotation that was generated by processing the copy of the first digital representation of the raw audio/video data 12, as described above.

Figure 7:
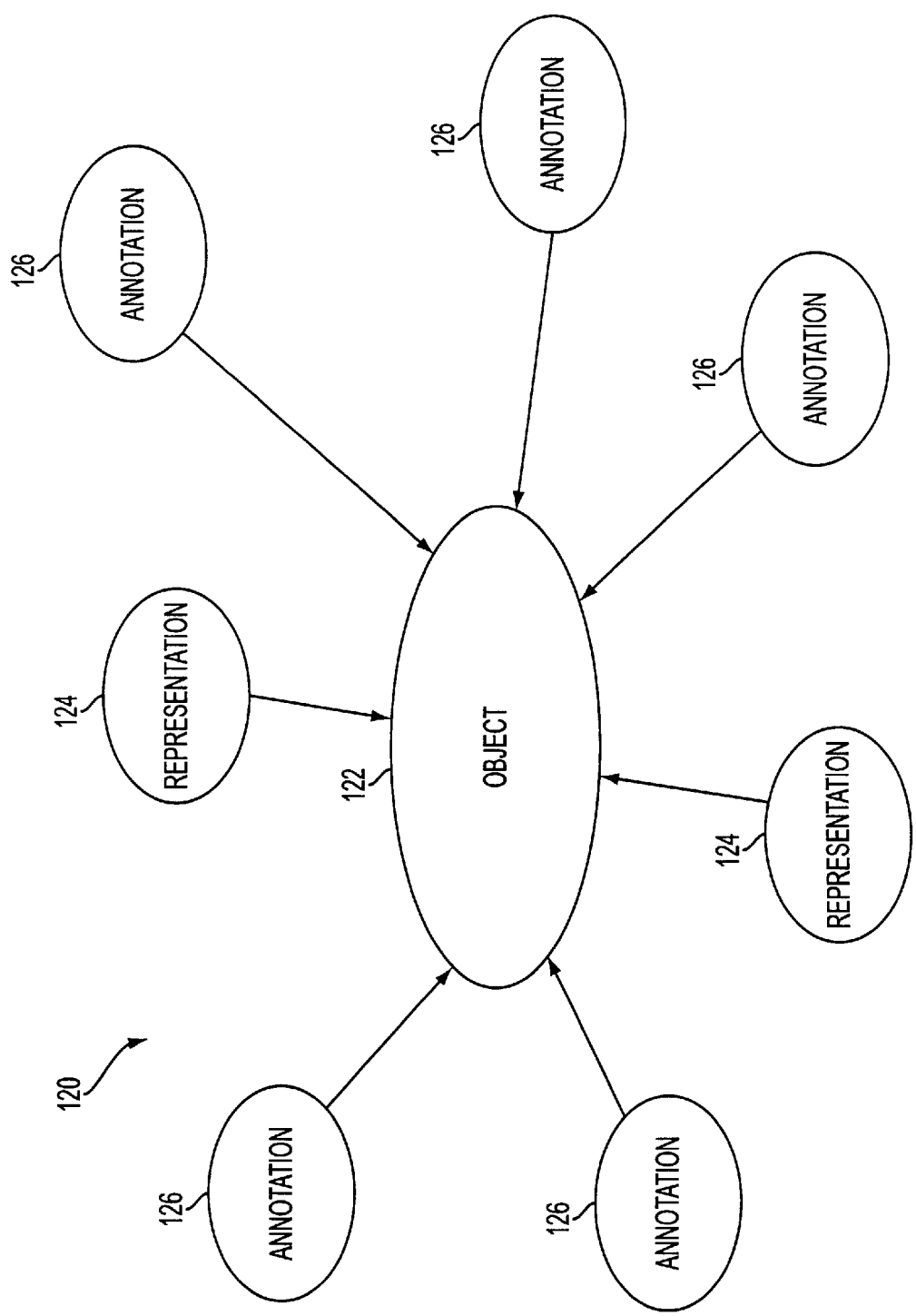
FIG. 7 shows the structure of an object database of a meta database in accordance with the present invention.

The structure of an object database 120 of the meta database 26 in accordance with the present invention is shown in FIG. 7. The object database 120 comprises an object 122, a plurality of representations 124 of the object 122, and a plurality of annotations 126 of the object 122. As indicated by the direction of the arrows, each of the plurality of representations 124 of the object 122 reference the object 122, and each of the plurality of annotations 126 of the object 122 reference the object 122. It should be noted that an annotation 126 may reference more than one object 122, indicating that the annotation 126 is shared by the more than one object 122.

All of the objects in the object database of the meta database 26 are listed in an object table 130 of the meta database 26, as shown in FIG. 8. Each of the objects in the object database of the meta database 26 are assigned an object identification number 132, as previously described. Each object identification number 132 is unique and is typically in numeric or alphanumeric form, although other forms are also permitted. Each of the objects in the object database of the meta database 26 are typically listed in the object table 130 according to the value of their object identification numbers 132, as shown.

Each of the objects in the object database of the meta database 26 are also assigned an object type 134. The object type 134 can be, for example, video or audio, corresponding to the type of data that is represented by the object in the object database of the meta database 26. Accordingly, each of the objects in the object database of the meta database 26 are listed in the object table 130 with a corresponding object type 134.

All of the representations in the object database of the meta database 26 are listed in a representation table 140 of the meta database 26, as shown in FIG. 9. Each of the representations in the object database of the meta database 26 are assigned a representation identification number 142. Similar to the object identification numbers 132, each representation identification number 142 is unique and is typically in numeric or alphanumeric form, although other forms are also permitted. Each of the representations in the object database of the meta database 26 are typically listed in the representation table 140 according to the value of their representation identification numbers 142, as shown.

As previously discussed, each of the representations in the object database of the meta database 26 is associated with an object in the object database of the meta database 26. Accordingly, each of the representations in the object database of the meta database 26 are listed in the representation table 140 with an associated object identification number 132.

Each of the representations in the object database of the meta database 26 are also assigned a representation type 144. The representation type 144 can be, for example, video/mpeg, video/x-realvideo, audio/mpeg, or audio/x-realvideo, corresponding to the format type of the representation in the object database of the meta database 26. Accordingly, each of the representations in the object database of the meta database 26 are listed in the representation table 140 with a corresponding representation type 144.

As previously discussed, each of the representations in the object database of the meta database 26 have an associated URL which identifies the location in the media database 22 where the representation can be found. Accordingly, each of the representations in the object database of the meta database 26 are listed in the representation table 140 with an associated URL 146.

Figures 10, 11:
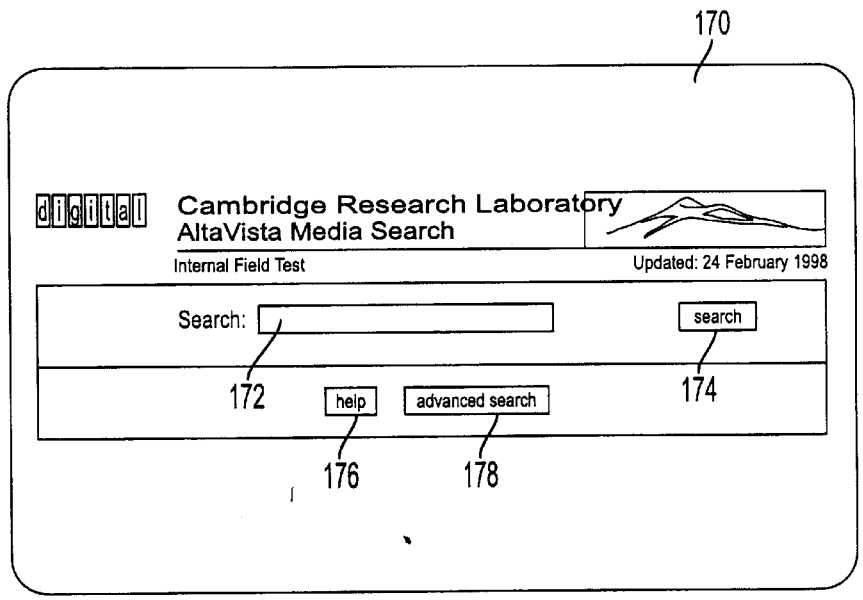
FIG. 10 shows an annotation table of a meta database in accordance with the present invention.
FIG. 11 shows an exemplary HTML query page in accordance with the present invention.

All of the annotations in the object database of the meta database 26 are listed in an annotation table 150 of the meta database 26, as shown in FIG. 10. Each of the annotations in the object database of the meta database 26 are assigned an annotation identification number 152. Similar to the object identification numbers 132 and the representation identification numbers 142, each annotation identification number 152 is unique and is typically in numeric or alphanumeric form, although other forms are also permitted. Each of the annotations in the object database of the meta database 26 are typically listed in the annotation table 150 according to the value of their annotation identification numbers 152, as shown.

As previously discussed, each of the annotations in the object database of the meta database 26 are associated with an object in the object database of the meta database 26. Accordingly, each of the annotations in the object database of the meta database 26 are listed in the annotation table 150 with an associated object identification number 132.

Each of the annotations in the object database of the meta database 26 are also assigned an annotation type 154. The annotation type 154 can be, for example, transcript, speaker, or keyframe. Each annotation type 154 corresponds to the type of annotation that has been generated for a corresponding object in the object database of the meta database 26. Accordingly, each of the annotations in the object database of the meta database 26 are listed in the annotation table 150 with a corresponding annotation type 154.

Each of the annotations in the object database of the meta database 26 have a corresponding annotation value 156. The annotation value 156 can be, for example, a word, the name of a speaker, or an URL which references an image in the media database 22. Each annotation value 156 corresponds to the actual annotated element of the object in the object database of the meta database 26. Accordingly, each of the annotations in the object database of the meta database 26 are listed in the annotation table 150 with a corresponding annotation value 156.

Annotations which have been generated for an object that represents an audio/video stream have a corresponding annotation start time 158 and a corresponding annotation end time 160. The annotation start time 158 corresponds to the location in the audio/video stream where an annotation actually begins. Conversely, the annotation end time 160 corresponds to the location in the audio/video stream where an annotation actually ends. Accordingly, each of the annotations in the object database of the meta database 26 which have been generated for an object that represents an audio/video stream are listed in the annotation table 150 with a corresponding annotation start time 158 and a corresponding annotation end time 160.

As previously described, the index database server 32 stores the annotations that were generated for the object in the meta database 26 corresponding to the raw audio/video data 12 in the index database 30 along with, or with reference thereto, the object identification number associated with the raw audio/video data 12. The index database server 32 then searches the index database 30 for annotations which match a query initiated by the user 11, and then obtains the object identification number associated with each matching annotation. The implementation of these steps in accordance with the present invention is directly related to the indexing process and the structure of the index database 30.

The index database server 32 stores the annotations in the index database 30 such that an entry is created in the index database 30 for each annotation value. Following each annotation value entry in the index database 30 is a list of start times for each occurrence of the annotation value within an associated object. The start times can be listed according to actual time of occurrence in the associated object or in delta value form. Following the list of start times for each occurrence of the annotation value within the associated object is the object identification number corresponding to the associated object, or a reference to such object identification number. Thus, each of these annotation value entries in the index database 30 is linked in some manner to the start times for each occurrence of the annotation value within an associated object and the object identification number corresponding to the associated object. Therefore, whenever the index database server 32 searches the index database 30 for annotation values which match a query, the start times for each occurrence of a matching annotation value within an associated object and the object identification number corresponding to the associated object can be easily obtained.

Once the index database server 32 has a matching annotation value, the start times for each occurrence of the matching annotation value within an associated object, and the object identification number corresponding to the associated object, the index database server 32 can send a message, including the matching annotation value, the start times for each occurrence of the matching annotation value within an associated object, and the object identification number corresponding to the associated object, over the communication network 34 to the librarian 28 requesting that the librarian 28 provide further information relating to the matching annotation value and the associated object identification number. Such information can include the annotation type, the annotation start time, the annotation end time, the representation type, the URL, and the object type associated with the matching annotation value and the associated object identification number, all of which have been described above. In short, the librarian 28 provides everything that the index database server 32 requires to build an HTML results page for presentation to the user 11.

At this point it should be noted that the start times for each occurrence of a matching annotation value within an associated object are included in the message from the index database server 32 to the librarian 28 so as to make searching the meta database 26 more efficient. That is, searching the meta database 26 for numerical values typically requires less processing than searching the meta database 26 for textual values. Also, a matching annotation value and the start times for each occurrence of a matching annotation value within an associated object are directly related. However, a matching annotation value is typically a textual value, whereas the start times for each occurrence of a matching annotation value within an associated object are numerical values. Thus, using the start times for each occurrence of a matching annotation value within an associated object to search the meta database 26 for information is more efficient than using a matching annotation value.

At this point it should be noted that the index database server 32 inherently knows that it must look to the librarian 28 to provide further information relating to the matching annotation value and the associated object identification number. That is, it is inherent to the index database server 32 that a request for further information relating to the matching annotation value and the associated object identification number must be sent to the librarian 28.

In view of the above, the operation of both the system 10A and system 10B can now be described in more detail. That is, system 10A and system 10B both operate such that subsequent to a request from the encoder client 14, the librarian 28 creates an object in the meta database 26, and stores information in the meta database 26 along with the object. This information includes the URL of a digital representation of media data, the form of the digital representation of the media data, the type (e.g., audio, video, etc.) of the form of the digital representation of the media data, the format in which the digital representation of the media data is stored at the URL, the URL and types of any ancillary files associated with the media data such as a transcript or closed-caption file, and any associated high-level meta data such as the title of the media data and/or its author.

After the object has been created, the annotation client 18 can request work from the librarian 28 and process digital representations which the librarian 28 has indicated have not already been processed by the annotation client 18, as previously described. The annotation client 18 employs an automatic process, called a daemon process, to perform the annotation function. Automatic daemon processes are preferred over human annotation processes, which can be a very laborious. However, automatic daemon processes which produce high quality results, appropriately termed trusted daemon processes, are sometimes hard to come by given the current state of technology. Thus, it is important to provide a flexible, distributed, open architecture which can be used to incorporate new approaches to automatic annotation. The present invention achieves this by allowing each annotation client 18 to communicate with the librarian 28 and the media database server 24 over the communication network 34 using a standard messaging protocol (e.g., HTTP messaging).

The annotation client 18 requests work from the librarian 28 by providing two boolean conditions, an identifier of the annotation client 18, a version number of the annotation client 18, and an estimate of how long the annotation client 18 will take to complete the work (i.e., the annotation process). The first boolean condition is used to test for the existence of an object which satisfies the input requirements of the daemon process. That is, if an object satisfies the condition, then the inputs necessary for the daemon process to run exist and are referenced in the meta database 26. The second boolean condition tests for the non-existence of the output produced by the daemon process. If these boolean conditions are satisfied, then the daemon process should be run on the object.

The librarian 28 provides work to the annotation client 18 by first creating a list containing all objects which satisfy both boolean conditions. The librarian 28 then filters the list by eliminating objects which are presently being processed, or locked, by another annotation client 18 having the same identifier and version number. The librarian 28 then creates a key for each object remaining on the list which identifies the annotation client 18 and includes an estimate of how long the annotation client 18 will take to complete the work. This key is used to lock out other annotation clients as described above. The librarian 28 then provides the URL of each digital representation remaining on the list to the annotation client 18 for processing, as previously described.

The annotation client 18 uses the returned work information to perform its operations. That is, the annotation client 18 uses the URL of each digital representation to request each digital representation from the media database server 22, as previously described. The annotation client 18 then performs its work.

Upon completion of its work, the annotation client 18 checks its work into the librarian 28 for storage in the meta database 26. The annotation client 18 accomplishes this task by returning the object identification number associated with the object, the newly generated annotation data, and the key to the librarian 28. The librarian 28 checks the key to make sure that it matches the key in a space reserved for the completed operation. If the annotation client 18 returns the correct key, and the estimated work completion time has not expired, the key will match and the librarian 28 will accept the complete result. However, if the estimated work completion time has expired, the key may also have expired if another annotation client 18, having the same identifier and version number, requested work after the estimated work completion time had expired. If this is the case, the work will have been given to the new requesting annotation client 18, and a new key will have been generated. Therefore, the first requesting annotation client 18 will not be able to check in its work.

The aforementioned protocol permits completely distributed processing of information with very low communications overhead. Also, the use of URLs makes it possible for the processing to occur anywhere on the network, although only privileged addresses (i.e., those belonging to trusted annotation clients 18) may install results in the librarian 28. Furthermore, the simple time stamp protocol makes the system tolerant to processing failures.

It is also possible to directly select an object to be worked on. This allows a human to force an order of work. This is useful for human review of annotations produced by automatic daemon processes. From the point of view of the librarian 28, a human sitting at an annotation station is just another requesting annotation client 18. However, the human will want to request work that has already been completed by an automatic daemon process by specifically searching for items and then locking those items with a key. When a human reviews the work, the probabilities of the annotation can be updated to nearly 1 because the annotations were reviewed via a manual process. When the work is checked in, the librarian 28 will check that the new annotations are of higher quality than the old annotations by looking at the probabilities associated with each annotation.

Some of the key features of the above-described approach are that the annotation clients 18 can request work via an independent action (although they must be trusted), that there is a simple locking mechanism to prevent annotation clients 18 from stepping on each other, that annotation clients 18 provide new annotation information based on transformations of the original object, that new types of annotation clients 18 can be added in a straightforward manner, that there are means for updating the results of annotation clients 18 (e.g., by version number), and that there are means for comparing the results of annotation clients 18 based on source (e.g., based on probability).

The index database server 32 indexes the meta database 26 by periodically requesting from the librarian 28 a list of object identification numbers which correspond to objects that have been created in the meta database 26. In response, the librarian 28 provides a list of object identification numbers which correspond to objects that have been created in the meta database 26 to the index database server 32. The index database server 32 then requests from the librarian 28, for each object identification number, a copy of all of the annotations that were generated for each object in the meta database 26. In response, the librarian 28 provides, for each object identification number, a copy of all of the annotations that were generated for each object in the meta database 26 to the index database server 32. The index database server 32 then stores the annotations that were generated for each object in the meta database 26 in the index database 30 along with, or with reference to, each associated object identification number.

As previously described, the browser client 20 sends a message, initiated by the user 11, to the index database server 32 requesting a search of the index database 30. In response, the index database server 32 provides an HTML query page to the browser client 20 for presentation to the user 11. The browser client 20 then presents the HTML query page to the user 11. Referring to FIG. 11, there is shown an exemplary HTML query page 170 including a search field 172, a user-selectable search command 174, a user-selectable "help" option 176, and a user-selectable "advanced search" option 178.

The user 11 enters a query through the HTML query page and the browser client 20 sends a message, including the query, to the index database server 32 for processing by the index database server 32. In response, the index database server 32 searches the index database 30 for annotation values which match the query. Once the index database server 32 has found matching annotation values, the index database server 32 ranks the matching annotation values according to relevance, and obtains the object identification number associated with each matching annotation value. The index database server 32 then requests the librarian 28 to provide further information relating to each matching annotation value by referencing each associated object identification number. As previously described, such information can include the annotation type, the annotation start time, the annotation end time, the representation type, the URL, and the object type associated with each matching annotation value and the associated object identification number. The librarian 28 then sends the requested information to the index database server 32.

At this point it should be noted that the index database server 32 ranks the matching annotation values using a modified document retrieval technique. The unmodified document retrieval technique uses a document as a basic unit, and determines the importance of a document based upon a query. That is, the importance of a document is based on the number of occurrences of each query word within the document, with each query word being weighted by the rarity of the query word in a document database. Thus, more rare words are given higher weights than common words, and documents with more query words receive higher total weights than documents with fewer query words. A typical equation for computing the score of a document is $$\text{score}(d) = \text{sum}\_\{q\} w[q] \quad (1)$$

wherein d is a document, q is a query word, sum_{q} is the number of times that the query word q appears in the document d, and w[q] is the weight of the query word q. It should be clear that the above-described technique requires using all of the words in a document for determining the weight of the document.

In audio/video retrieval, it is a requirement that users be able to start an audio/video stream from the most relevant position within the audio/visual stream. Thus, an indexing system must not only determine that an audio/video stream is relevant, but also all relevant locations within the audio/video stream, and preferably rank the relevance of those locations.

The present invention modifies the above-described technique by letting h[i] be a valid starting location within an audio/video stream, and letting L[q,j] be the jth location of the query word q in the audio/video stream. Then the score at valid starting location h[i] can be given by $$\text{score}(h[i]) = \text{sum}\_\{L[q,j] >= h[i]\} w[q] \exp(-(L[q,j]-h[i])/\text{DELTA}) \quad (2)$$

wherein DELTA is a setable distance weight equal to 10–30 seconds. Thus, the score at a valid starting location is a weighted sum over all the locations the query word appears after the valid starting location, where the weight of each appearance of a query word is the product of the query word weight and a negative exponential weight on the distance between the occurrence of the query word and the query word in time. This modified ranking technique provides a unique advantage to the index database server 32 of the present invention.

The index database server 32 uses the information provided by the librarian 28 to build an HTML results page for presentation to the user 11. The index database server 32 builds the HTML results page by creating an image or an icon for each matching annotation value. Each image or icon is hyperlinked to a function or script which allows the user 11 to browse and/or retrieve all or a portion of a corresponding digital representation. Once the HTML results page has been built, the index database server 32 sends the HTML results page to the browser client 20 for presentation to the user 11. The browser client 20 then presents the HTML results page to the user 11 so that the user 11 can select one of the images or icons so as to browse and/or retrieve all or a portion of a corresponding digital representation.

Figure 12:
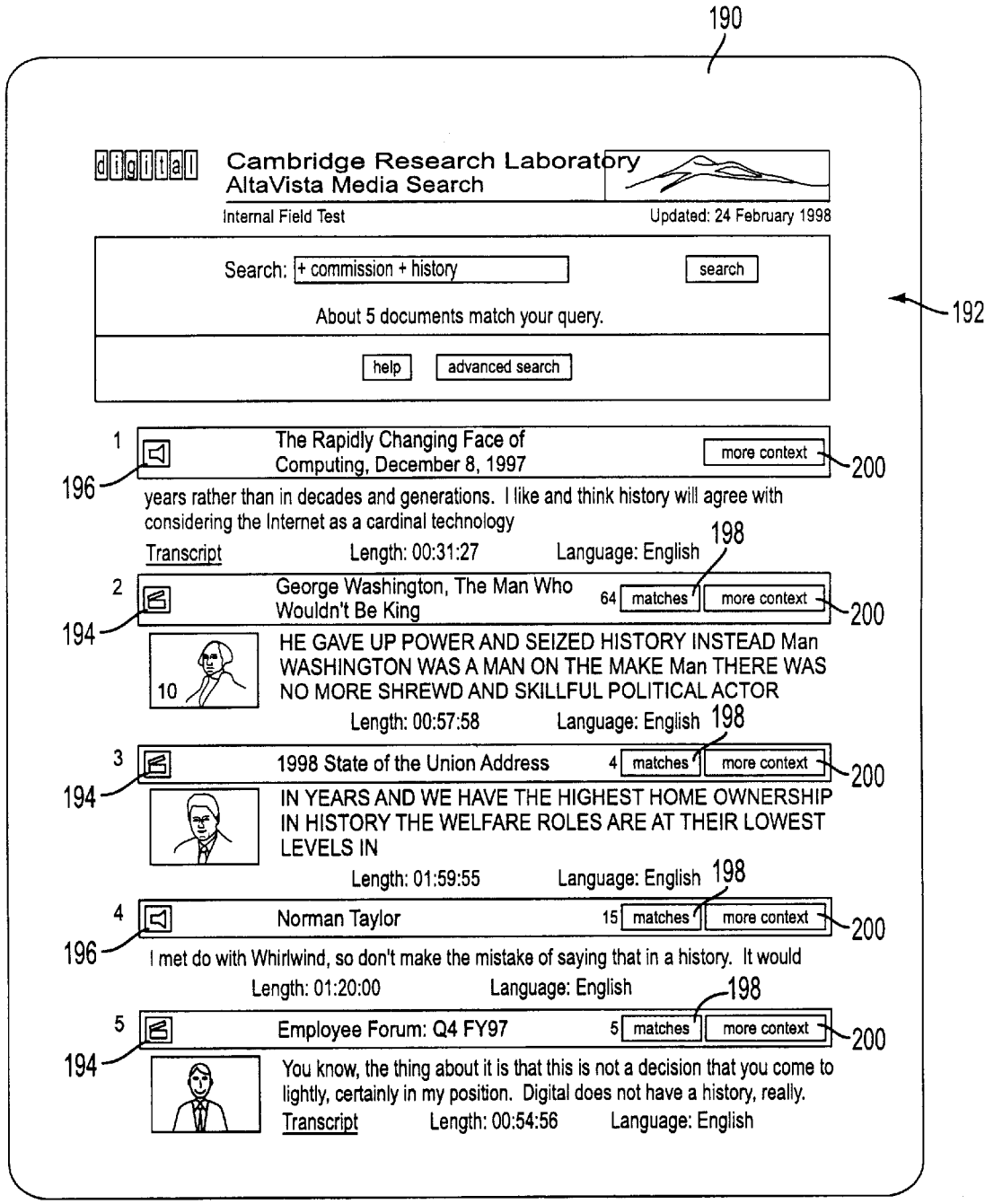
FIG. 12 shows an exemplary HTML results page in accordance with the present invention.

Referring to FIG. 12, there is shown an exemplary HTML results page 190 for a query which included the terms "commission" and "history". The HTML results page 190 includes an almost exact copy of the HTML query page 192 containing a statement as to the number of matches that were found for the query, which in this case is five. The HTML results page 190 also includes either a video icon 194 or an audio icon 196 depending upon the type of object that is associated with each matching annotation value. Both the video icon 154 and the audio icon 196 are provided along with some detail about each associated object. For example, in the case of a video icon 194, the title of the corresponding video stream, a frame of the corresponding video stream, a textual excerpt from the corresponding video stream, the length of the corresponding video stream, the language that is spoken in the corresponding video stream, and the number of matches that occur within the corresponding video stream are shown or listed along with the video icon 194. In the case of an audio icon 196, the title of the corresponding audio stream, a textual excerpt from the corresponding audio stream, the length of the corresponding audio stream, the language that is spoken in the corresponding audio stream, and the number of matches that occur within the corresponding audio stream are listed along with the audio icon 196.

If the user 11 selects either a video icon 194 or an audio icon 196, then the video or audio stream will play from the location of the first match within the corresponding video or audio stream. This is possible because both the video icon 194 and the audio icon 196 are hyperlinked back to a function or script in the index database server 32, whereby the index database server 32 uses the information provided by the librarian 28 to access a corresponding digital representation in the media database 22 using the extended URL format described above. If more than one match occurs within either a video or an audio stream, then a user-selectable "matches" option 198 is provided to allow the user 11 browse each location within the video or audio stream where a match has occurred, as described in more detail below. If the user 11 desires to browse locations surrounding the location of the first match within the corresponding video or audio stream, then a user-selectable "more context" option 200 is provided to allow the user 11 browse locations surrounding the location of the first match within the corresponding video or audio stream, as described in more detail below.

Figure 13:
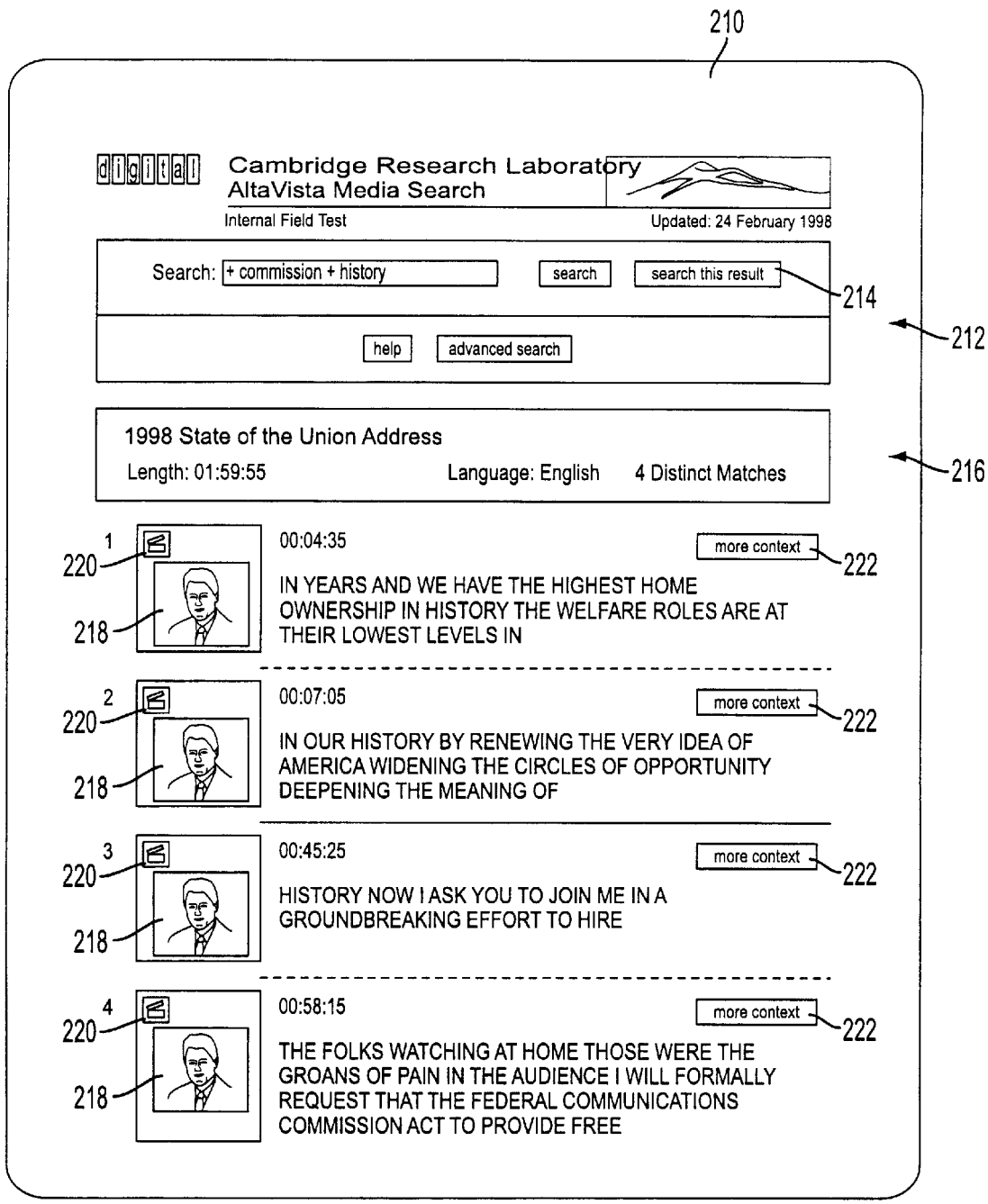
FIG. 13 shows an exemplary HTML matches page in accordance with the present invention.

To illustrate the above-described "matches" option 198, it is assumed that the user 11 has selected the "matches" option 198 associated with the third match presented in the HTML results page 190 (i.e., the video entitled, 1998 State of the Union Address). Referring to FIG. 13, there is shown an exemplary HTML matches page 210 for allowing the user 11 to browse each location within the video stream associated with the third match presented in the HTML results page 190 where a match has occurred. The HTML matches page 210 includes an almost exact copy of the HTML query page 212, which contains an additional user-selectable "search this result" option 214 for allowing the user 11 to refine the results of a previous query. The HTML matches page 210 also includes a matches header 216 containing the title of the corresponding video stream, the length of the corresponding video stream, the language that is spoken in the corresponding video stream, and the number of matches that occur within the corresponding video stream, which in this case is four. The HTML matches page 210 further includes a frame 218 which corresponds to each match that occurs within the corresponding video stream. Each frame 218 includes a video icon 220, which functions in a manner similar to the previously-described video icon 194. Each frame 218 and corresponding video icon 220 are provided along with some detail about each associated match that occurs within the corresponding video stream. For example, the exact time location of the match within the corresponding video stream and a textual excerpt from the corresponding video stream are listed along with each frame 218 and corresponding video icon 220. Similar to the HTML results page 190, the HTML matches page 210 includes a user-selectable "more context" option 222 for each match to allow the user 11 browse locations surrounding the location of each associated match within the corresponding video stream.

Figure 14:
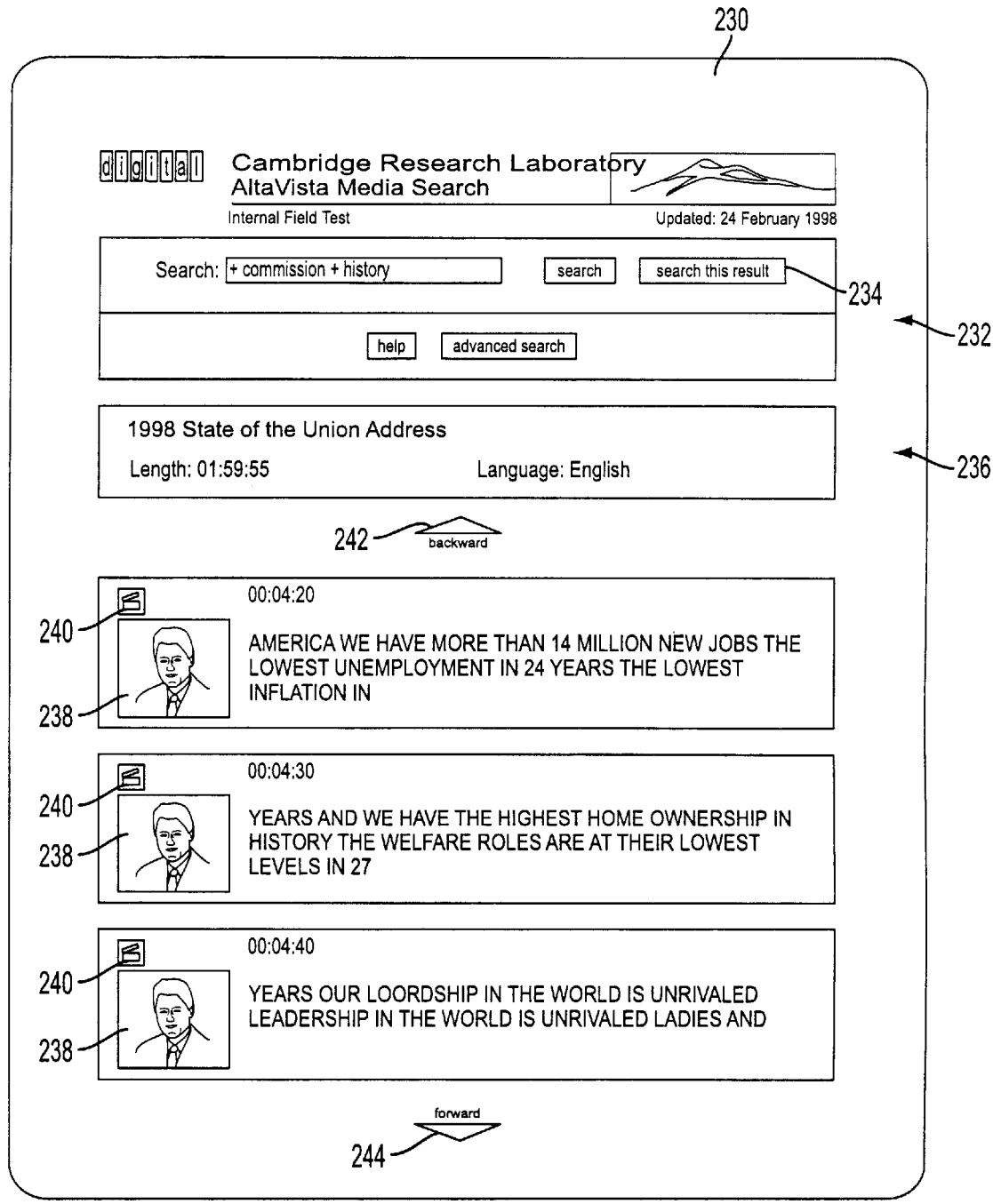
FIG. 14 shows an exemplary HTML more context page in accordance with the present invention.

To illustrate the above-described "more context" options 200 and 222, it is assumed that the user 11 has selected the "more context" option 222 associated with the first match presented in the HTML matches page 210. Referring to FIG. 14, there is shown an exemplary HTML more context page 230 for allowing the user 11 to browse locations surrounding the location of the first match presented in the HTML matches page 210 within the corresponding video stream. The HTML more context page 230 includes an almost exact copy of the HTML query page 232, which contains an additional user-selectable "search this result" option 234 for allowing the user 11 to refine the results of a previous query. The HTML more context page 230 also includes a more context header 236 containing the title of the corresponding video stream, the length of the corresponding video stream, and the language that is spoken in the corresponding video stream. The HTML more context page 230 further includes a frame 238 which corresponds to an actual frame within the corresponding video stream. Each frame 238 includes a video icon 240, which functions in a manner similar to the previously-described video icons 194 and 220. Each frame 238 and corresponding video icon 240 are provided along with some detail about each associated frame 238 within the corresponding video stream. For example, the exact time location of the frame 238 within the corresponding video stream and a textual excerpt from the corresponding video stream are listed along with each frame 238 and corresponding video icon 240. The HTML more context page 230 still further includes a user-selectable "backward" option 242 and a user-selectable "forward" option 244 for allowing the user 11 to browse further locations surrounding the location of the first match presented in the HTML matches page 210 within the corresponding video stream.

Figure 15:
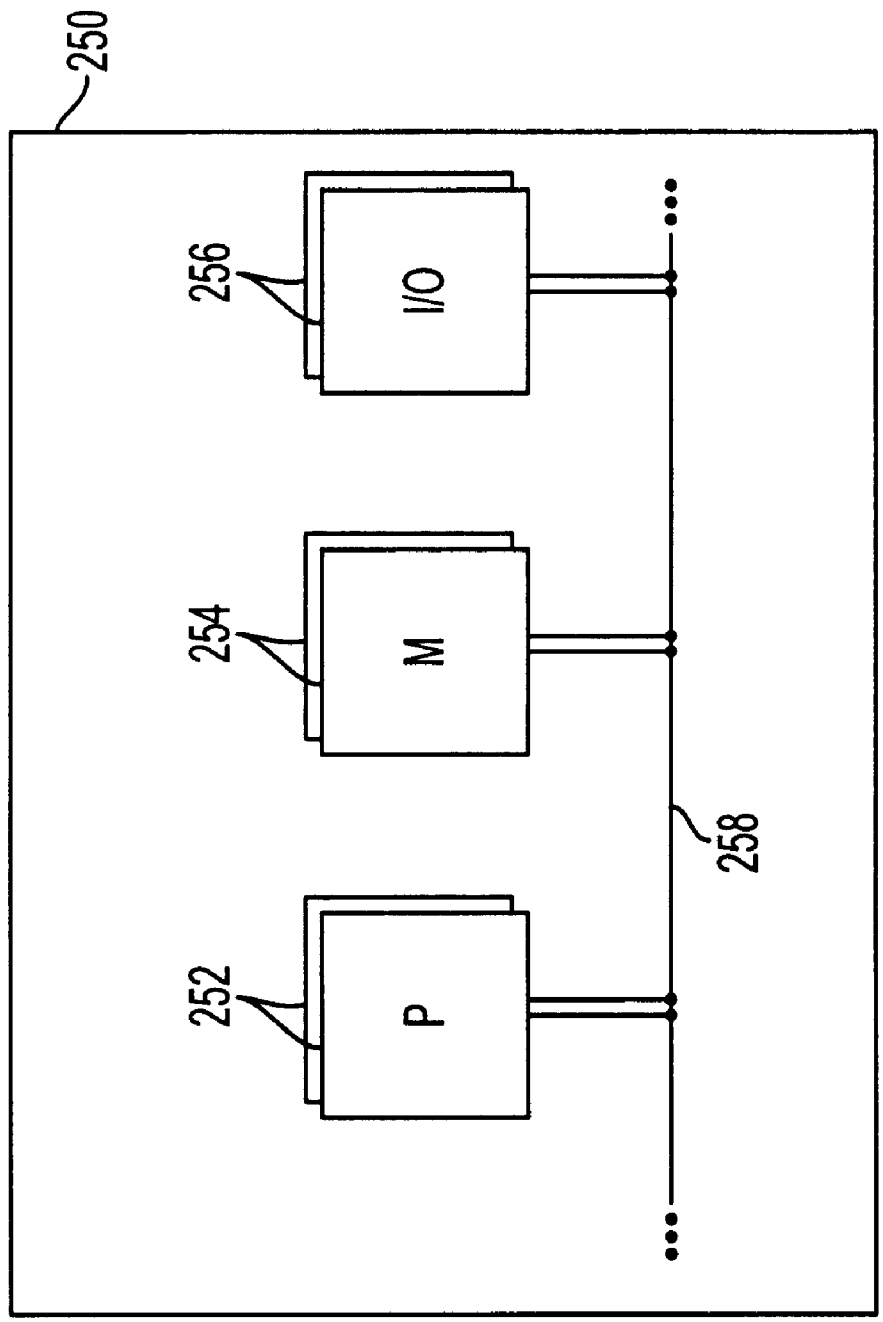
FIG. 15 is a schematic diagram of a processing device for facilitating the implementation of input data processing and output data generation in the components of the present invention.

Lastly, it should be noted that the encoder client 14, the transcoder client 16, the annotation client 18, the browser client 20, the media database server 24, the librarian 28, the index database server 32, and the encoder 36 all involve the processing of input data and the generation of output data to some extent. The processing of the input data and the generation of the output data are preferably implemented by software programs. Thus, referring to FIG. 15, each of the above-described system components preferably comprises a processing device 250 including at least one processor (P) 252, memory (M) 254, and input/output (I/O) interface 256, connected to each other by a bus 258, for facilitating the implementation of input data processing and output data generation in each of the above-described system components.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for processing data, the method comprising the steps of:

receiving a first representation of data at a processing device; and processing the first representation of data so as to generate a second representation of data, the second representation of data including a plurality of dependent data representations and a plurality of independent data representations, each of the plurality of dependent data representations being aligned in time with a corresponding one of the plurality of independent data representations, each of the plurality of dependent data representations representing a respective one of a plurality of difference frames of a video sequence, each of the plurality of independent data representations representing a respective one of a plurality of complete frames of the video sequence.

2. The method as defined in claim 1, wherein the first representation of data includes the plurality of dependent data representations.

3. The method as defined in claim 2, wherein the first representation of data further includes less than all of the plurality of independent data representations.

4. The method as defined in claim 1, wherein each of the plurality of dependent data representations is dependent upon at least another of the plurality of dependent data representations or one of the plurality of independent data representations.

5. The method as defined in claim 1, wherein:

the plurality of dependent data representations are arranged in a sequence; and each of the plurality of dependent data representations is determined based upon a difference from a previous one of the plurality of dependent data representations in the sequence.

6. The method as defined in claim 1, wherein each of the plurality of independent data representations is independent of all other of the plurality of independent data representations.

7. The method as defined in claim 1, wherein the processing of the first representation of data includes:

combining the plurality of dependent data representations and the plurality of independent data representations so as to generate the second representation of data.

8. The method as defined in claim 1, wherein the processing of the first representation of data includes:
digitizing the first representation of data; and
encoding the digitized first representation of data so as to generate the plurality of dependent data representations.

9. The method as defined in claim 8, wherein the processing of the first representation of data further includes:
generating a prediction of the digitized first representation of data; and
encoding the prediction of the digitized first representation of data so as to generate the plurality of independent data representations.

10. The method as defined in claim 8, wherein the processing of the first representation of data further includes:
encoding the digitized first representation of data so as to generate the plurality of independent data representations.

11. The method as defined in claim 1, wherein the processing of the first representation of data includes:
decoding the first representation of data; and
encoding the decoded first representation of data so as to generate the plurality of dependent data representations.

12. The method as defined in claim 11, wherein the processing of the first representation of data further includes:
generating a prediction of the decoded first representation of data; and
encoding the prediction of the decoded first representation of data so as to generate the plurality of independent data representations.

13. The method as defined in claim 11, wherein the processing of the first representation of data further includes:
encoding the decoded first representation of data so as to generate the plurality of independent data representations.

14. An apparatus for processing data, the apparatus comprising:
a receiver for receiving a first representation of data; and
a processor for processing the first representation of data so as to generate a second representation of data, the second representation of data including a plurality of dependent data representations and a plurality of independent data representations, each of the plurality of dependent data representations being aligned in time with a corresponding one of the plurality of independent data representations, each of the plurality of dependent data representations representing a respective one of a plurality of difference frames of a video sequence, each of the plurality of independent data representations representing a respective one of a plurality of complete frames of a video sequence.

15. The apparatus as defined in claim 14, wherein each of the plurality of dependent data representations is dependent upon at least another of the plurality of dependent data representations or one of the plurality of independent data representations.

16. The apparatus as defined in claim 14, wherein:
the plurality of dependent data representations are arranged in a sequence; and
each of the plurality of dependent data representations is determined based upon a difference from a previous one of the plurality of dependent data representations in the sequence.

17. The apparatus as defined in claim 14, wherein each of the plurality of independent data representations is independent of all other of the plurality of independent data representations.

18. An article of manufacture for processing data, the article of manufacture comprising:
a computer readable storage medium; and
computer programming stored on the storage medium; wherein the stored computer programming is configured to be readable from the computer readable storage medium by a computer and thereby cause the computer to operate so as to:
receive a first representation of data; and
process the first representation of data so as to generate a second representation of data, the second representation of data including a plurality of dependent data representations and a plurality of independent data representations, each of the plurality of dependent data representations being aligned in time with a corresponding one of the plurality of independent data representations, each of the plurality of dependent data representations representing a respective one of a plurality of difference frames of a video sequence, each of the plurality of independent data representations representing a respective one of a plurality of complete frames of a video sequence.

19. The article of manufacture as defined in claim 18, wherein each of the plurality of dependent data representations is dependent upon at least another of the plurality of dependent data representations or one of the plurality of independent data representations.

20. The article of manufacture as defined in claim 18, wherein:
the plurality of dependent data representations are arranged in a sequence; and
each of the plurality of dependent data representations is determined based upon a difference from a previous one of the plurality of dependent data representations in the sequence.

21. The article of manufacture as defined in claim 18, wherein each of the plurality of independent data representations is independent of all other of the plurality of independent data representations.

* * * * *